United States Patent [19]
Miller

[11] Patent Number: 5,881,969
[45] Date of Patent: Mar. 16, 1999

[54] LOCK-ON-AFTER LAUNCH MISSILE GUIDANCE SYSTEM USING THREE DIMENSIONAL SCENE RECONSTRUCTION

[75] Inventor: Billy Keith Miller, Plano, Tex.

[73] Assignee: Raytheon TI Systems, Inc., Lewisville, Tex.

[21] Appl. No.: 984,493

[22] Filed: Dec. 3, 1997

Related U.S. Application Data

[60] Provisional application No. 60/033,397 Dec. 17, 1996.

[51] Int. Cl.[6] .............................. F41G 7/00; G06K 9/00; H04N 7/00
[52] U.S. Cl. .......................... 244/3.17; 382/103; 348/117
[58] Field of Search .................................. 244/3.17, 3.16; 382/103; 348/113, 117; 342/64

[56] References Cited

U.S. PATENT DOCUMENTS 5,052,045  9/1991  Peregrim et al. .

FOREIGN PATENT DOCUMENTS

| | | |
|---|---|---|
| 0579187A | 1/1994 | European Pat. Off. . |
| 3145374A | 6/1983 | Germany . |
| 675638A | 10/1990 | Switzerland . |

OTHER PUBLICATIONS

Milgram, et al., "3–D Model Matching for Missile Guidance", SPIE vol. 238, Image Processing for Missile Guidance (1980), pp. 232–238.

Christy, et al., "Terminal Air–to–Ground Missile Guidance by Infrared Seeker", SPIE vol. 3086, pp. 233–243 (1997).

*Primary Examiner*—Charles T. Jordan
*Assistant Examiner*—Theresa M. Wesson
*Attorney, Agent, or Firm*—Baker & Botts, L.L.P.

[57] ABSTRACT

A system and method for recognizing a target and then guiding a projectile to that target. Initially, unique 3D features of the target are obtained and stored in a data base. The projectile is then directed to the general area of the target and the scene in that general area is observed by the projectile and compared with the data base on a three dimensional basis. When a target is located which contains the unique 3D features of the target of interest within some preset maximum margin of error, the projectile is then directed to that target.

18 Claims, 12 Drawing Sheets

FIG. 1
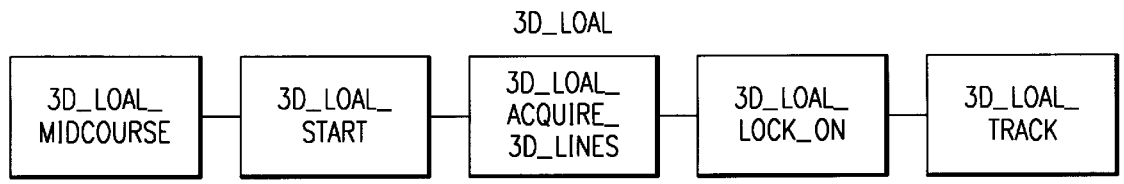
FIG. 2
FIG. 4
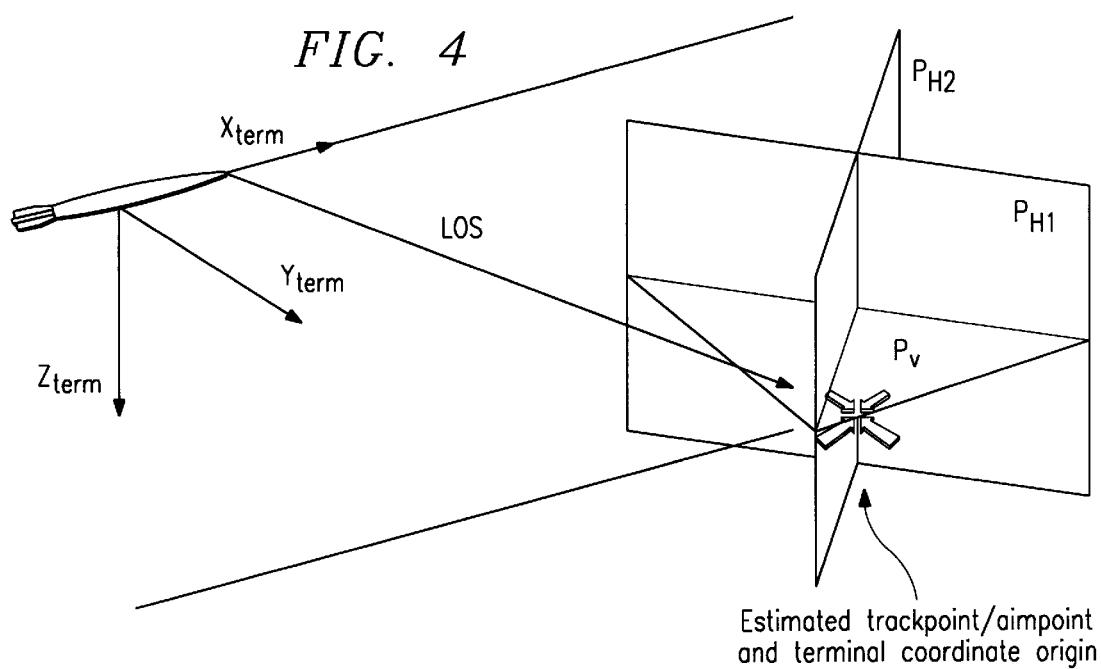
FIG. 5
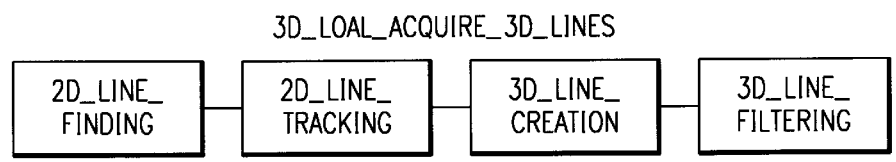

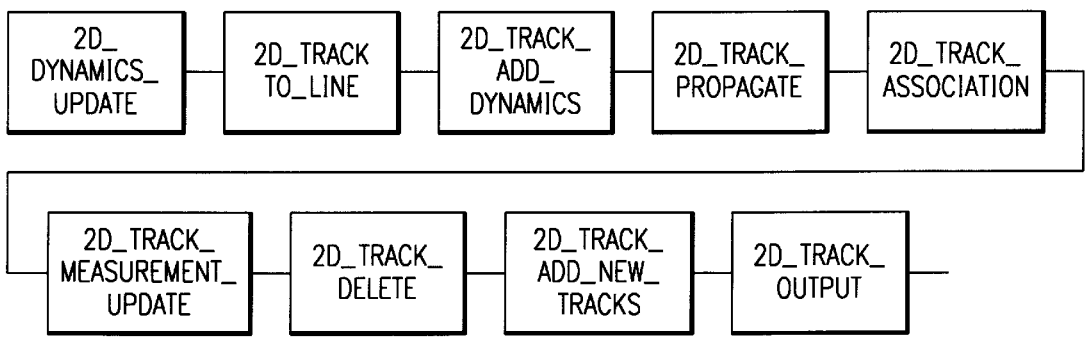
FIG. 10A
FIG. 10B
FIG. 11
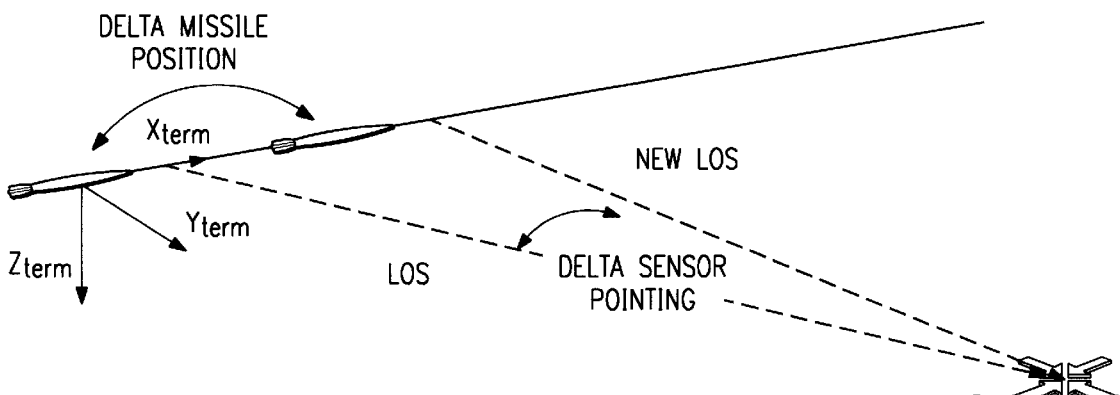
FIG. 12

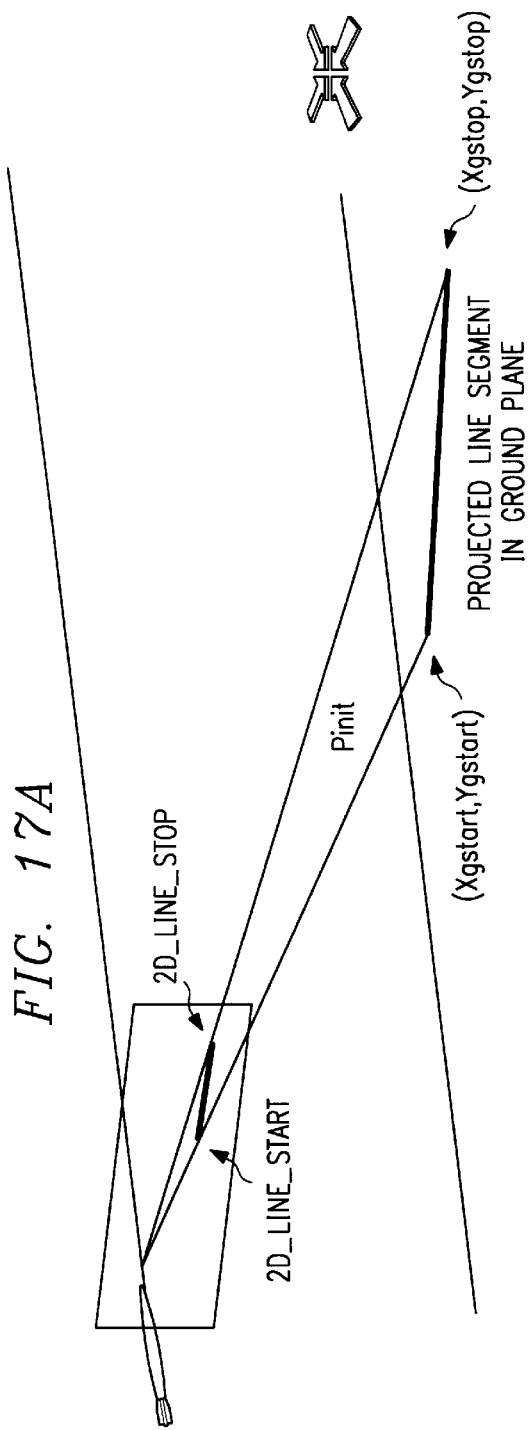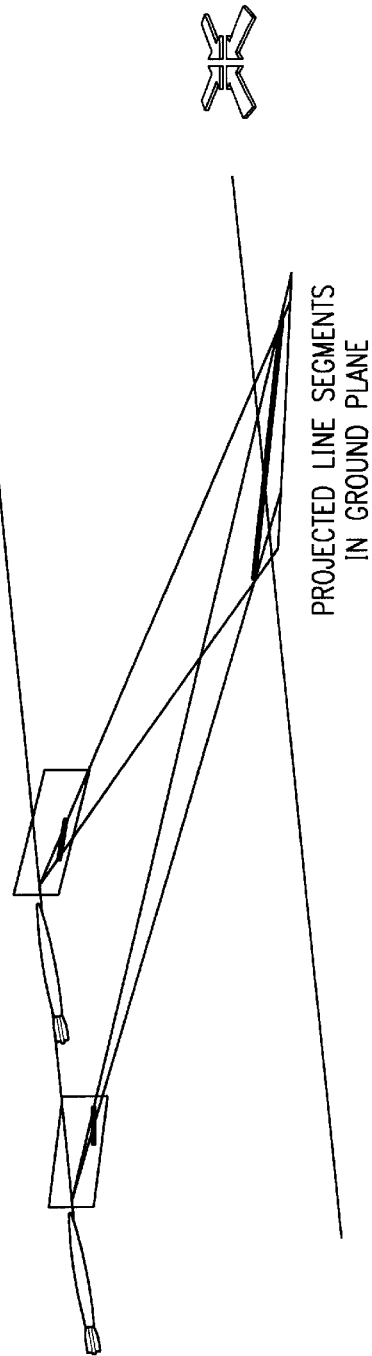

3D VIEW

TOP VIEW

FIG. 20A

PROJECTED SENSOR FOOTPRINT

SENSOR IMAGE

FIG. 20B

FOOTPRINT PLUS MISSILE UNCERTAINTY

SENSOR IMAGE

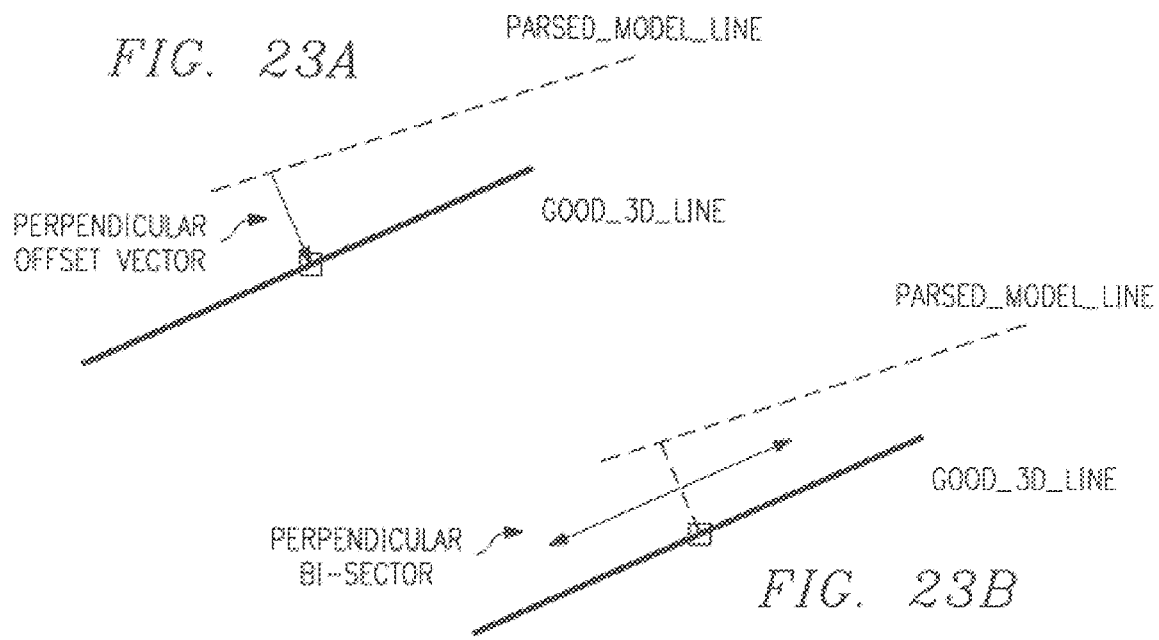
FIG. 23A
FIG. 23B
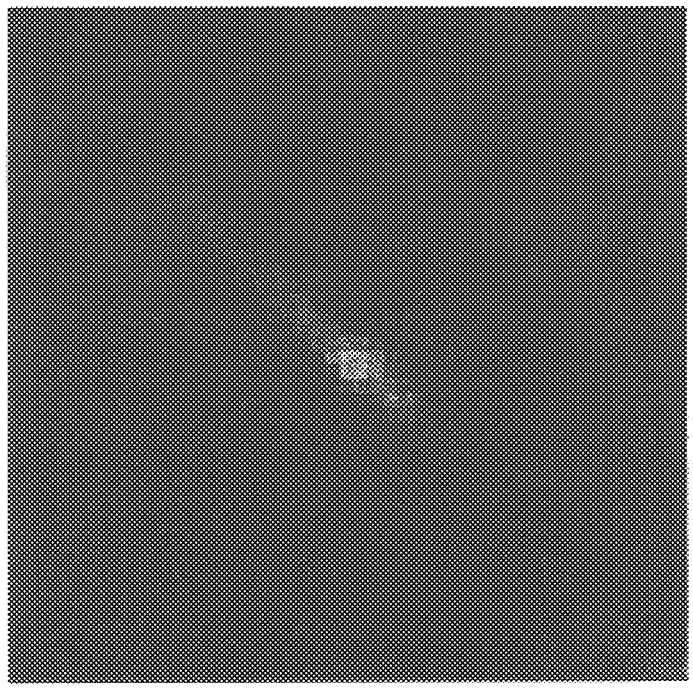
FIG. 24
FIG. 25

LOCK-ON-AFTER LAUNCH MISSILE GUIDANCE SYSTEM USING THREE DIMENSIONAL SCENE RECONSTRUCTION

CROSS REFERENCE TO RELATED APPLICATIONS

This application claims priority under 35 USC §119 of provisional application number Ser. No. 60/033,397 filed Dec. 17, 1996.

BACKGROUND OF THE INVENTION

1. Field of the Invention

This invention relates to a lock-on-after-launch (LOAL) guidance system and, more specifically, to such a guidance system using three dimensional lock-on-after launch (3D_LOAL) scene reconstruction.

2. Brief Description of the Prior Art

Much of the prior art relating to LOAL guidance systems relates to variations of the theme of projecting three dimensional (3D) models into their two dimensional (2D) representations and then registering these representations to an image. Such systems are exemplified by Ditzler, W. R., et al., "Multispectral Image Correlation for Air to Ground Targeting," presented at symposium for *"Low-Level and Nap of the Earth (N.O.E.) Night Operations,"* Rome, Italy, October, 1994.

In the current state of the missile guidance autonomous LOAL algorithms, a painstaking procedure known as "Prebriefing" or "Target Reference Preparation" is required. "Prebriefing" is the act of preparing a description of the target that the algorithm requires in order to locate the target and "prebrief" is the output of prebriefing. In the prebriefing task, the mission planners must follow a rule based approach in which they model a few salient features of the target area which are: (1) unique in shape and (2) visible in contrast to the missile at its preselected lock-on point. Thus, the mission planner must know "geometry" and "signature". Geometry information can be obtained rather easily, but signature further requires identifying the material types of the target objects and factoring in weather (wind, cloud cover, atmosphere, sun angles, etc.) and internal heat sources (heating/cooling, generators, boilers, etc.). Although the main signature question is whether there exists a moderate amount of contrast for certain regions, this can still be extremely time consuming.

Performance level prediction can also be extremely time consuming because extensive Monte Carlo based (randomized) simulations with feedback iteration on the prebriefing must be performed. Once the prebriefing is prepared, the missile is ready for launching.

Although the actual prebriefing model is three dimensional in nature and defined in a world coordinate system, it is only applicable to a limited set of missile approaches and viewing ranges. Once the missile has flown into this "basket" of approach angles and ranges, the three dimensional template is projected into the two dimensional image planes, hidden surfaces are removed and the template is registered to the image. Here, the two dimensional nature of the registration process becomes a limiting factor in the accuracy of aimpoint (the point the missile tries to guide to in the target area) placement. For example, small errors in position or orientation can cause perspective differences in the image that dilute the registration. Fortunately, there is some tolerance to transformation inaccuracies in this method, however this method provides no mathematical mechanism for correcting these transformation errors. For this reason, aimpoints offset from the center of this template must also be kept to short distances because even small rotation errors can result in quite large aimpoint offset errors which degrade overall circular error probable (CEP), the minimum radius around the aimpoint which contains 50 percent of the actual missile impact points. In many cases, multiple templates must be defined for various stages of the mission to overcome these errors and accommodate pixel-on-target constraints due to target size.

SUMMARY OF THE INVENTION

In accordance with the present invention, rather than using a two dimensional description of the target (template) to match a two dimensional realization of the target (the sensor image), a three dimensional description of the target area is generated using the sequence of two dimensional sensor images combined with relative movement of the missile. This 3D description is matched to a 3D model of the target area or a 3D description of the target scene is projected into the 2D reconnaissance image and registers in 2D.

In addition, rather than manually modeling only a few unique aspects of the target, the entire target area is automatically modeled. Also, rather than relying upon prediction of a few required contrasts, the invention merely requires location of a sufficient number of object outlines to be unique to the target. Furthermore, rather than having one preset range at which acquisition must take place, acquisition is a continuous process in which the final aimpoint decision can be easily delayed until a high enough level of registration confidence is achieved.

The above is accomplished in conjunction with a 3D_LOAL algorithm composed of two parts, one part being 3D_Prebriefing (the target area processing that takes place before the missile is launched) and 3D_LOAL which occurs after the missile is in flight.

In conjunction with 3D_Prebriefing, the algorithm may use several different types of information to acquire aimpoints. These types of information are, in order of desirability, (1) facet based, (2) wire frame based prebrief and (3) recon-photo based prebrief.

In the case of facet based information, individual objects in the target area are described by 3D polygons (facets). Therefore, the algorithm determines which object properties will be visible from any particular viewpoint and eliminates hidden lines from ever being considered in the matching process. This type of information is usually available for "high value" targets. An aimpoint and trackpoint are described as 3D points referenced to this set of 3D facets. The trackpoint is the point on the target the missile sensor is trying to find and the aimpoint is the point it is trying to hit. The geodetic values of each 3D facet for each object are grouped and stored along with the 3D aimpoint as the prebrief file.

In the case of wire frame based prebrief information, 3D endpoints of sides of polygons are available, but object grouping information is not. Therefore, hidden lines cannot be removed. Thus, matching times are longer and discrimination capability is slightly reduced. The aimpoint and trackpoint are described as 3D points referenced to this set of 3D lines. The geodetic values of the 3D line endpoints, the aimpoint and trackpoint are stored as the prebrief file.

In the case of recon-photo based prebrief information, a digitized overhead photo is available, yielding a single 2D description of the target area. First, the image is processed for line features by 2D_line_finding. Then, a trackpoint and an aimpoint are selected. The extracted lines with a distance $D^A$ of the trackpoint are then calculated. These lines are then highlighted and the aimpoint altitude with respect to the lines is entered into the mission planner. The geodetic values of the 2D line endpoints, the aimpoint and the trackpoint are stored as the prebrief file.

The inflight portion of the algorithm has six processing stages, these stages being (1) 3D_LOAL_MIDCOURSE, (2) 3D_LOAL_START, (3) 3D_LOAL_ACQUIRE_3D_LINES, (4) 3D_LOAL_MATCH_PARAMETERS, (5) 3D_LOAL_LOCK_ON and (6) 3D LOAL_TRACK.

During the 3D_LOAL_MIDCOURSE portion (1) of the missile flight, guidance is provided by the navigation hardware of the missile (GPS or inertial). The missile is flown to an area near the target. Once the line-of-sight (LOS) range between the estimated missile and estimated aimpoint falls below the start_range_value, the 3D_LOAL_START stage (2) begins.

If the facet-based prebrief_model is used, the 3D_LOAL algorithm runs in background to remove hidden lines from the prebrief_model for the viewing conditions expected at the 3D_LOAL_START point.

If a recon-based prebrief_model is used and only an aimpoint, trackpoint and a raw recon-photo is available, then the 3D_LOAL 2D_line_finding algorithm can run in background and process the recon-photo for 2D_lines to be used in the model matching portion of 3D_LOAL. This option is included for an operation scenario in which a recon-photo has been datalinked to the missile after its launch.

The 3D_LOAL_START stage (2) should last for only one frame. Its purpose is to define a 3D reference system in which all 3D line extraction and matching calculations and all tracking propagation calculations take place.

The missile orientation is used to define the terminal coordinate system as follows:

The missile down vector (the vector which emanates from the missile center of gravity and points directly at the center of the earth) is mapped to the terminal coordinate system z vector.

The component of the missile body vector (the vector which emanates from the missile's center of gravity and points through the nose cone of the missile) parallel to the ground plane is mapped into the terminal coordinate system x vector. The cross product of the terminal coordinate system (x×z) vectors defines the terminal coordinate system y vector. The origin of the terminal coordinate system is calculated as the preplanned trackpoint.

The terminal coordinate system to the earth centered earth fixed (ECEF) (a right handed three dimensional coordinate system which has its origin at the center of the earth, a Z vector through the north pole and an X vector through the equator/Greenwich meridian intersection) conversion transforms as well as the ECEF coordinate of the terminal coordinate system origin are saved. These values do not change for the remainder of 3D_LOAL.

Also, three reference planes (Ph1 and Ph2 for horizontally oriented 3D_lines and Pv for vertically oriented lines 3D_lines) are calculated. Ph1 and Ph2 are parallel to the terminal coordinate z vector and form 45 degree angles with the x and y directions. Pv is the terminal groundplane. All three planes intersect the terminal system (0,0,0) point.

The purpose of the 3D_LOAL_ACQUIRE_3D_LINES stage is to generate Ng number of well-behaved 3D_lines (good_3D_lines) for matching against the stored prebrief model or image. Several phases of processing are required to generate these 3D lines. The phases are (1) 2D_line_finding, (2) 2D_line_tracking, (3) 3D_line_creation and (4) 3D_line_filtering.

In phase (1), for each frame processed, a "2D line_finder" must be executed on the incoming sensor image. There are many line-finders in the open literature that can be used, examples being Burns, Brian, et. al., "Extracting Straight Lines," *IEEE Trans. on Pattern Analysis and Machine Intelligence,* PAMI-8, pp 425–455, July 1986 and Shen, J. and Castan, S., "Further results of DRF Method for Edge Detection", 9*th International Conference on Pattern Recognition,* Rome, 1988. The line finder used requires the properties of (a) extracting 2D_lines to sub-pixel accuracy, (b) generating a defined phase feature, (c) having degree of straightness control and (4) having minimum length control. The set of 2D_lines generated on each frame is passed to phase (2) 2D_line tracking.

In phase (2), the set of 2D_lines from each frame is correlated and tracked over time. To do this, 2D_lines from frame N are projected into the terminal groundplane using the missile position and sensor pointing parameters. On frame N+1, these 2D_line terminal positions are projected back into the sensor image plane using the frame N+1 missile position and sensor pointing parameters. If a 2D_line from frame N+1 matches the position, orientation and length of a projected 2D_line from frame N within some tolerance, a correlation occurs. A 2D_line that correlates is referred to as a 2D_track. Eventually, as 2D_tracks are correlated over more and more frames, additional information, namely velocity, can be calculated for the tracks and incorporated into the frame-to-frame propagation. Also, a Kalman filter is applied to the states of the 2D_tracks to further refine these states.

The 2D_tracks which correlate for the minimum number of frames ($N_{confirmed}$) are marked as confirmed_2D_tracks. Confirmed_2D-tracks are passed to the next phase where their complete trajectories are recorded for 3D_line_creation processing. Those 2D_lines that do not correlate are used to initialize 2D_tracks on the N+1 frame. If these new 2D_tracks do not correlate within a small number frames ($N_{m\ of\ n}$), they are deleted from the 2D_track list. Also, 2D_tracks that do not correlate over a certain number of frames ($N_{delete}$) at any time in the 3D_LOAL process are also deleted.

In the phase (3) 3D_line_creation, the confirmed_2D_track states, along with the missile position, orientation and sensor pointing information, are saved on every frame on which a confirmed_2D_track update (correlation) occurs. The algorithm continues to buffer the confirmed_2D_track states until the missile position has changed enough to generate a sufficient angle for triangulation of the real 3D position of the confirmed_2D_tracks. The length of this buffering ($N_{wait}$) is customized for each confirmed_2D_track and is a function of the missile position at the time the 2D_track is confirmed and the expected frame number of the first triangulation snapshot. In general, the value $N_{wait}$ will be longer for 2D_tracks generated at longer ranges. The wait value is generated using a lookup table which is a function of the missile down-range ($m_x$), cross_range ($m_y$) and altitude ($m_z$) with respect to the expected aimpoint. A confirmed_2D track that stops updating is deleted after ($N_{delete\_t}$) number of frames.

Once a confirmed_2D_track has been present for its wait period, it can become a 3D_line. Two planes are calculated: Pnow-wait composed of the missile position at frame ($N_{now\text{-}wait}$) and the two endpoints of the 2D_line from frame ($N_{now\text{-}wait}$) projected into the terminal groundplane; and Pnow composed of the missile_position at frame $N_{now}$ and the two endpoints of the 2D_line from frame $N_{now}$ projected into the terminal groundplane. The intersection of these two planes defines the 3D_line. The intersection of the 3D_line with the three reference planes is then calculated. The reference plane which generates the largest incidence angle is assigned as the reference for this 3D_line. The intercept of the 3D_line is defined with respect to this assigned reference plane for the life of the 3D_line. At this point, the line state is defined as a slope vector $(s_x, s_y, s_z)$ and an intercept $(i_x, i_y, i_z)$ in the terminal coordinate system. To complete a 3D_line definition, two endpoint distances $d_1$ and $d_2$ must be calculated. To provide this calculation, first planes P1 and P2, consisting of the missile position from frame $N_{now}$, the missile position from frame $N_{now}$ projected into the terminal groundplane and respectively the 2D_line endpoints from frame $N_{now}$ projected into the terminal groundplane are calculated. Next, the intersection of planes P1 and P2 is found with the line $\{(s_x,s_y,s_z)(i_x,i_y,i_z)\}$, yielding the points I1 and I2. Finally, the distances $d_1$ and $d_2$ of points I1 and I2 from point $(i_x,i_y,i_z)$ are found. The 3D_line is then initialized as the eight state vector $[s_x,s_y,s_z,i_x,i_y,i_z,d_1,d_2]$.

In the phase (4) 3D_line_filtering, each 3D_line is updated on each frame after it is initialized if a history exists for frame $(N_{now\_now\_wait})$. An update state is calculated just as before except for the history information used which is newer and only the intercept with the assigned reference plane is required. If a 2D-line endpoint from the new frame is within a buffer area of the edge of the sensor image, an updated distance state calculation is not computed for that endpoint. The new 3D_line state is combined with the previous state using a Kalman filter. The variances of the states are then examined to see if they have fallen below a preset threshold $(T_{qc})$. If a 3D_line passes this quality control check, it becomes a good_3D_line. Once a preset number $(N_g)$ of good_3D_lines is obtained, the 3D_LOAL algorithm transitions to the 3D_LOAL_MATCH_PARAMETERS stage. A 3D_line which stops updating before becoming a good_3D_line is deleted after $(N_{delete\_t})$ number of frames.

In the 3D_LOAL_MATCH_PARAMETERS stage, all the processing described in the prior stage continues (i.e., 3D_LOAL continues to update 3D_lines and find new ones). In addition 3D_LOAL begins the process of matching the set of good_3D_lines to a subset of the prebrief 3D_model_lines. This is accomplished in four phases denoted as (1) pertubate_model_transform, (2) parse_model_lines, (3) find_line_correspondences and (4) angle_error_processing.

In the pertubate_model_transform phase (1), because the exact orientation of the missile may not be known at the time the terminal coordinate system is defined, there will be rotation errors between the prebriefed model as it is transformed into the terminal coordinate system and the true orientation of the target area. These errors should be limited to ± a few fractions of a degree. The 3D_LOAL algorithm generates pertubations to the ECEF_to_terminal direction cosine matrix (DCM) (a 3×3 matrix used to transform 3D vectors from one three dimensional coordinate system to another) matrix on each frame that covers the range of rotation transform errors expected in the navigation and prebriefing systems due to pitch and yaw. These pertubations are applied in a systematic manner to the model transformation so that all regions of the rotation uncertainty area are covered in a timely fashion. An acceptable search strategy for uniform pitch and yaw errors of ±βp,βy degrees respectively which requires 18 frames is:

do for αp=(−βp,0,βp)
do for αy=(−βy,0,βy)
   pertubate $DCM_{ecef\_to\_terminal}$ by (αp,αy).

The purpose of the pertubation is to align lines near the edge of the parsed prebrief. If the angle errors are sufficiently small, this step may be eliminated completely since phase (4) (angle_error_processing) will still generate acceptable results. Otherwise, some combinations may be excluded or rearranged to shorten the timeline. For example, if 2D correspondence (see below) is to be used, then only αy needs to be perturbed (this is the case when the recon-photo prebrief option is used).

In the parse_model_lines phase (2), the 3D_LOAL algorithm must extract those lines in the 3D prebrief_model which correspond to the area covered by the seeker footprint. To do this, all model lines are first transformed into the terminal coordinate system using the pertubated transform. Next, the sensor footprint on the current frame is projected into the terminal groundplane. All model lines are found whose 2D projections into the terminal groundplane (2D_model_lines) are all or partially contained in the sensor footprint. For this frame, the model_lines are marked as parsed_model_lines.

The find_line_correspondences phase (3) is divided into a find_2D_line_correspondence portion and a find_3D_line_correspondence portion.

In the find_2D_line_correspondence portion, each good_3D_line is projected into the terminal groundplane. For each projected good_3D_line, all projected parsed_model_lines are found which have the same angle ± some angle tolerance $T_\alpha$. For each pair of lines produced by the angle nearness test, a position nearness test is applied. A 2D search box is generated around each projected good_3D_line by extending its endpoints and its sides by the position uncertainty of the missile navigation and targeting error. All projected parsed_model_lines that intersect any part of this region are found. The set of all such pairs of projected good_3D_lines matching projected parsed_model_lines via the described angle and distances test constitute the 2D_line_correspondences for this frame.

In the find_3D_line_correspondence portion, for each good 3D_line, all parsed_model_lines are found which have the same angle in 3D space ± some angle tolerance Tφ. For each pair of lines produced by the angle nearness test, a position nearness test is applied. A 3D search volume is generated around each projected good_3D_line by extending its endpoints and its sides by the position uncertainty of the missile navigation and targeting error. All parsed_model_lines that intersect any part of this region are found. The set of all such pairs of good_3D_lines matching parsed_model_lines via the described angle and distances test constitute the 3D_line_correspondences for this frame.

Phase (4) angle_error_processing is broken into 2D_angle_error_processing and 3D_angle_error_processing.

In 2D_angle_error_processing, only the yaw angle is pertubated. For each pertubation, the angle differences between the 2D_line_correspondence pairs are calculated and accumulated in a yaw_angle_error_histogram (the pertubation error must be subtracted from this difference to avoid a bias). The end of the pertubation sequence marks the finish for 3D_LOAL_MATCH_PARAMETERS. On the last frame, the yaw_angle_error_histogram is smoothed and its peak value is estimated. The angle error bin for which this peak occurs is the estimated_yaw_error between the model and the extracted scene and is applied to all subsequent model transformations in the 3D_LOAL_LOCK_ON stage.

In 3D_angle_error_processing, the procedure is very similar to the 2D version except that the angle difference between 3D_line_correspondence pairs is decomposed into a yaw, pitch and roll component and accumulated in a yaw_angle_error_histogram, pitch_angle_error_histogram and roll_angle_error_histogram respectively. In this case, three sets of projections must be made and correspondence angle errors accumulated, one for each axis of rotation. Again, the end of the pertubation sequence marks the finish of 3D_LOAL_MATCH_PARAMETERS. The two histograms are smoothed and their peak values become the estimated_yaw_error and estimated_pitch_error between the model and the extracted scene. Finally, these estimates are applied to all subsequent model transformations in the 3D_LOAL_LOCK_ON stage.

The 3D_LOAL_LOCK_ON stage is broken into a 2D_vector_registration portion and a 2½D_vector_registration portion.

In the 2D_vector_registration portion, the 2D_line_correspondence pairs are operated upon and only calculate a 2D trackpoint_correction_vector or groundplane xy offset. For each 2D_line_correspondence pair: (a) the 2D vector that is perpendicular to the projected parsed_model_line and intersects the midpoint of the projected good_3D-line is determined and (b) the 2D perpendicular bisector of this 2D vector is found. The intersection of all 2D perpendicular bisectors with every other 2D perpendicular bisector is calculated. These intersection are accumulated in a 2D array, where the location in the array indicates the 2D location of the intersection. Next, this array is mean filtered. The location of the maximum value in the mean filtered array times 2 is the 2D trackpoint_correction_vector estimate.

In the 2½D vector registration portion, the 2½D_vector_registration algorithm adds the z component to the trackpoint_correction_vector. The 2D bisector intersection array generated above is then searched for $N_{peaks}$ local maximas. For each of the peaks, all 3D_line_correspondences are calculated using a much smaller uncertainty value (~10 meters) and the xy offset corresponding to that peak location. For each "non-vertical" good_3D_line, a vertical offset vector to the center of the corresponding parsed_model_line is computed. These vertical values are accumulated in a z_vector_histogram which is an array sorted by the Z vertical value containing the number of occurrences of each vertical value. There are $N_{peaks}$ z_vector_histograms. All of the z_vector_histograms are mean filtered and the maximum value is found. The bin containing the maximum value is the z component of trackpoint_correction_vector. The (x,y) value generating that histogram completes the 3D trackpoint_correction_vector.

When the maximum z value reaches some minimum value ($T_{lock-on}$) 3D_LOAL transitions to the 3D_LOAL_TRACK stage. The following actions are involved in this transition:

(a) the trackpoint_correction_vector is added to the missile trackpoint location.

(b) this new aimpoint is copied to the sensor staring point.

(c) the trackpoint_correction_vector is mapped into the translation portion of the prebrief_model transformation (if the correction to the sensor pointing vector is large, the sensor pointing transition may be made gradually to avoid a sudden loss of matching lines and therefore loss of updates to the trackpoint_correction_vector).

(d) the target location error uncertainty is collapsed to the missile inertial navigation uncertainty for small distances.

(e) since the missile may not be flying at the trackpoint (trackpoint and aimpoint) the difference between the prebriefed trackpoint and aimpoint is added to the corrected trackpoint to become the new aimpoint at which the missile will guide to.

In the 3D_LOAL_TRACK stage, the 3D_LOAL algorithm continues to execute all portions of the algorithm required to generate good-3D-lines and an aimpoint_correction_vector. It may, as an options also continue to process updates to the estimated_yaw_error and/or estimated_pitch_error. In reality, 3D_LOAL_TRACK is 3D_LOAL_LOCK_ON at a very high frame rate. The higher frame rate is achieved by two factors, (1) the navigation and targeting errors are greatly reduced by the 3D_LOAL_LOCK_ON snapshots(s) and (2) the shrinking sensor footprint results in fewer model_lines being parsed. The only other difference is that the set of parameters, i.e., $N_{wait}$, $N_{delete}$, Ng, is modified. This phase continues until a blind range is reached at which time the missile finishes its flight via inertial navigation.

It should be understood that though the invention is described with references to direction of a missile, the invention can also be used for passive navigation of aircraft, realtime extraction of 3D site models from reconnaissance image sequences, pattern recognition, robot vision, etc.

BRIEF DESCRIPTION OF THE DRAWINGS

FIG. 1 is a schematic diagram representing the two main parts of 3DLOAL system;

FIG. 2 is a schematic diagram illustrating the five main processing phases of the 3DLOAL portion of the system;

FIG. 4 is a diagram of the terminal coordinate system and its reference planes as established on the 3D_LOAL_START frame;

FIG. 5 is a schematic diagram of the 3D_LOAL_ACQUIRE 3D_LINES processing phase;

FIG. 10 illustrates the line merging calculation, in part (A) the line extended a preset distance and in part (B) a mergable line is found;

FIG. 11 is a schematic diagram showing the nine procedures required to create 2D_tracks from 2D_lines;

FIG. 12 illustrates the calculation of updated missile positions and sensor pointing angles in the terminal coordinate system;

FIGS. 17(A) and (B) illustrate the calculation of the init plane for a 3D_line using the missile position and the projection of th eline endpoints into the groundplane;

FIG. 20 illustrates the calculation of the sensor footprint parsing area with (A) being the direct sensor footprint projection and (B) being the footprint extension by the targeting uncertainty;

FIG. 23 shows the 2D perpendicular bisector calculation for a 2D_line_correspondence pair with (A) being the calculation of the normal between the two lines and (B) being the calculation of the perpendicular bisector of the normal;

FIG. 24 shows an example 2D registration score surface as generated by simulation;

FIG. 25 is a schematic diagram of the three sub-procedures required to calculate a 2.5D registration or the altitude correction for the amipoint/trackpoint vector;

DESCRIPTION OF THE PREFERRED EMBODIMENT

Initially, a three dimensional data base is developed of the target area including the target. This data base is developed, for example, by prior reconnaissance photographs of the target area from as many directions as possible. In this way, a 2D picture of the target area is formulated from any direction of approach to the target. This data base is provided on the missile initially with target location being provided in conjunction with the data base as well as with standard GPS and/or inertial navigation techniques. This is described hereinbelow as "prebriefing".

Since the general location of the target area is known, the missile can be directed into the general area of the target by appropriate programming of the missile navigation system in conjunction with GPS and/or inertial navigation in standard manner before or after firing the missile, the preferred embodiment herein providing such target area location information prior to firing. This is also a part of the prebriefing step.

To explain the invention in conjunction with prebriefing option (1) as set forth above, a 3D wire frame model of the target site is initially generated. The wire frame model of the target area including the target is provided and obtained prior to missile launch by prior air reconnaissance or from other sources and stored in a data base, preferably in the missile. The data generated during the 3D LOAL step of FIG. 1 will then be compared with this data base for 3D matches to ultimately lock onto the target when the match meets some minimum predetermined degree of reliability.

Figure 3:
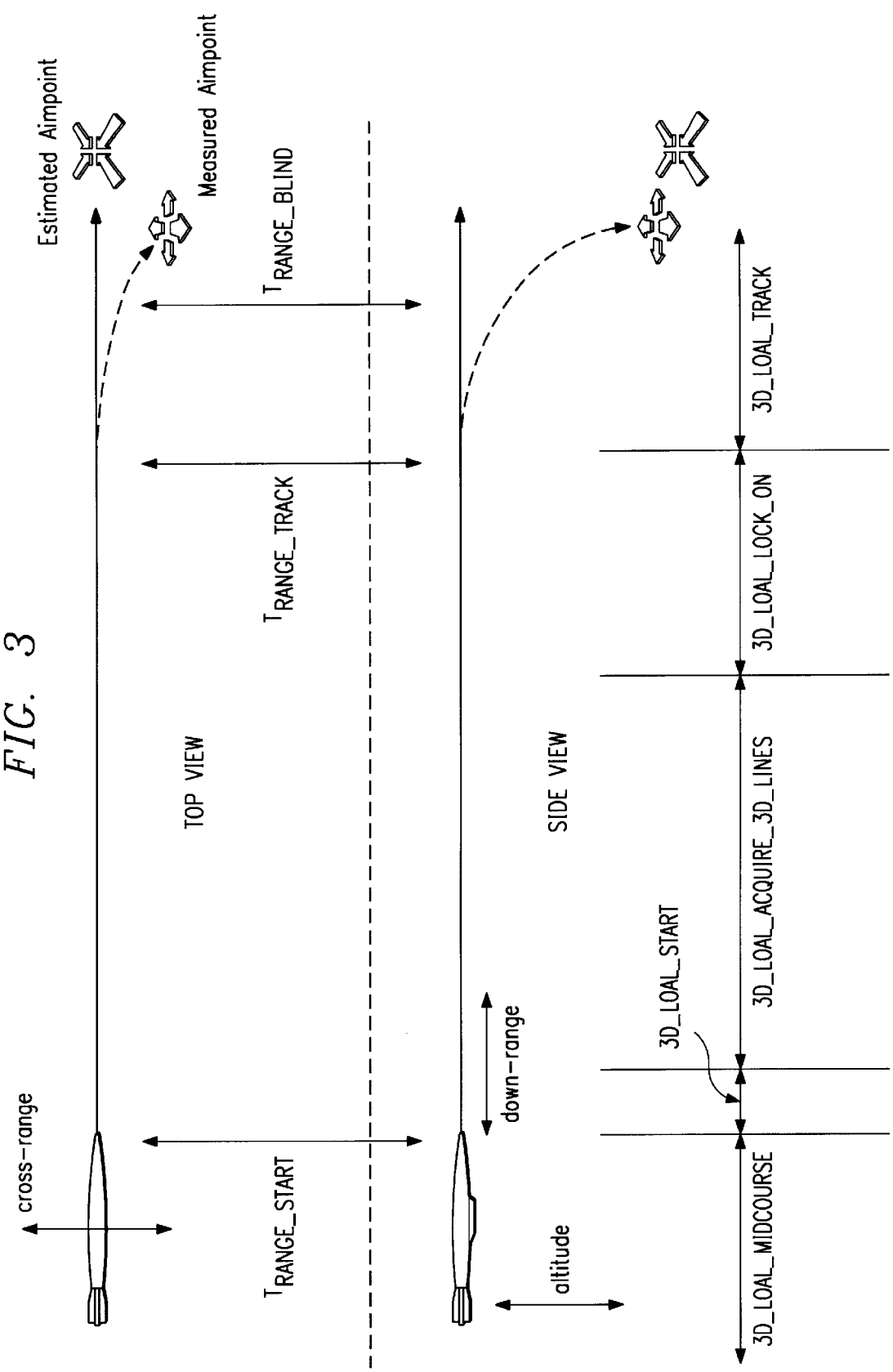
FIG. 3 is top and side views of the desired missile trajectory once 3DLOAL starts and as related to the five processing phases.

In the 3D LOAL operation, as shown in some detail with reference to FIGS. 2, 5, 6, 11, 15, 18, 19, 21 and 25, upon launch of the missile and during the 3D LOAL midcourse stage, missile flight guidance to a preset location in the region of the target is provided by the missile navigation hardware which is controlled in response to the global positioning system (GPS) or inertially controlled. In the initial flight path of the missile to an area near the target, the missile sensor is commencing staring at the estimated target aimpoint/trackpoint as shown in FIG. 3 where the solid line indicates missile direction at the start of 3DLOAL and the dashed line indicates eventual missile flight path. In this description, the targeting aimpoint and trackpoint are assumed to be the same, however an offset aimpoint may be used by simply adding the delta between the prebriefed trackpoint and prebriefed aimpoint prior to passing it to the missile guidance and control. This allows bland targets to also be prosecuted.

With reference to FIG. 4, in the terminal area setup stage, which should last for only one frame of operation, a local 3D reference system is defined in which all 3D line extraction and matching calculations and all tracking propagation calculations take place. The missile orientation at the time of obtaining the frame, such as by camera or other scene reproducing means, is used to define the terminal coordinate system. Also, three reference planes are defined for calculating line intercepts, these reference planes being preferably, but not limited to, a standard three coordinate system with the coordinates mutually perpendicular to each other.

Figure 14A:
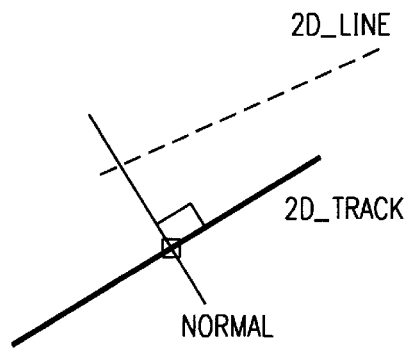
FIG. 14 is an illustration of the 2D-track/2D_line merging criteria with (A) showing the normal calculation between the 2D_track and 2D_line, (B) showing the distance calculation between the two and (C) showing the percent overlap calculation.
Figure 14B:
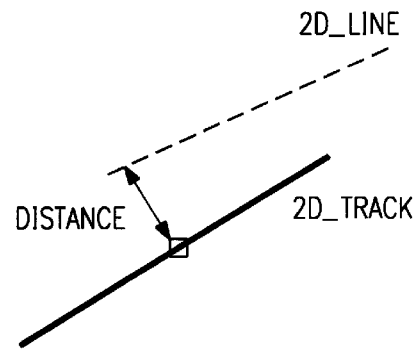
Figure 14C:
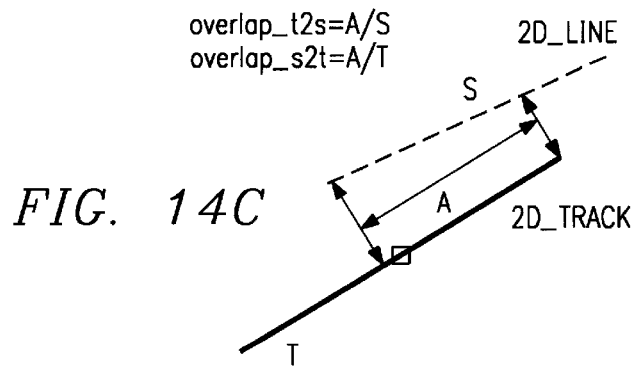
Figure 15:
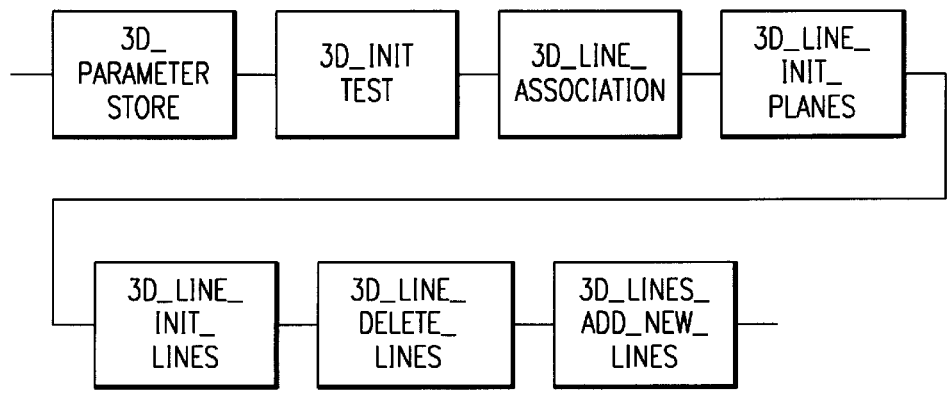
FIG. 15 is a schematic diagram showing the seven processing procedures required to turn 2D_tracks into 3D_lines.
Figure 16:
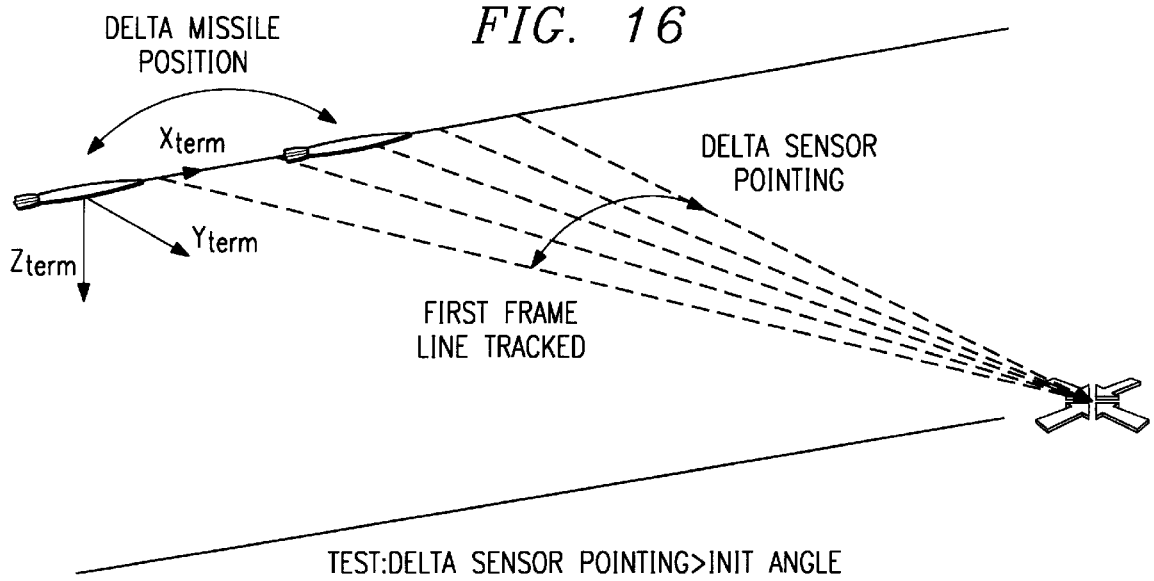
FIG. 16 illustrates the change in prespective test used to determine when a 3D_line can be initialized.
Figure 18:
FIG. 18 is a schematic diagram of the three sub-procedures required to filter 3D_lines so that they become good_3D_lines and can be used in the model matching phase of 3D_LOAL.

With reference to FIG. 5, in the 3D line acquisition stage, and $N_g$ number is generated for well-behaved 3D_lines (good_3D_lines) for matching against the stored prebrief model or image. Four phases of processing are required to generate these 3D lines, these phases being (1) 2D line finding, (2) 2D line tracking, (3) 3D line creation and (4) 3D line filtering. With reference to FIGS. 7 to 10, in the 2D line finding phase, for each frame processed, a 2D_line_finder must be executed on the incoming sensor image. There are many known line-finders that can be used, examples being Burns, Brian, et. al., "Extracting Straight Lines," *IEEE Trans. on Pattern Analysis and Machine Intelligence*, PAMI-8, pp 425–455, July 1986 and Shen, J. and Castan, S., "Further results of DRF Method for Edge Detection," *9th International Conference on Pattern Recognition*, Rome, 1988. The set of 2D_lines generated on each frame is passed to the next phase, which is 2D line tracking. With reference to FIGS. 11 to 14, in the 2D line tracking phase, the set of 2D_lines from each frame must be correlated and tracked over time, as, for example, by the algorithm described by Giles, Brent, Miller, Keith, Newton, Scott, "Advanced Tracker Algorithm Description", May, 1995. To do this, 2D_lines from frame N are propagated into the sensor image plane using frame N+1 missile position and sensor pointing parameters. If a 2D_line from frame N+1 matches the position, orientation and length of a projected 2D_line from frame N within some tolerance, a correlation occurs, forming a 2D_track. A Kalman filter is applied to the states of a 2D_track to further refine such tracks. A 2D_track which correlates for a minimum number of frames is marked as confirmed and passed to the next phase. With reference to FIGS. 15 to 17, the next phase is 3D line creation wherein the states of the confirmed_2D_tracks, along with missile position, orientation and sensor pointing information, are saved on every frame on which a confirmed_2D_track update (correlation). occurs. The algorithm continues to buffer the confirmed_2D_track states until the missile position has changed sufficiently to generate a sufficient angle for triangulation of the real 3D position of the confirmed_2D_tracks. At this point, two planes are calculated to define a 3D_line, $P_{now}$, composed of the missile position at frame $N_{now}$ and the two endpoints of the 2D_line from frame $N_{now}$ projected into the terminal groundplane and $P_{now\text{-}wait}$ composed of the missile position at frame $N_{now\text{-}wait}$ and the two endpoints of the 2D_line from frame $N_{now\text{-}wait}$ projected into the terminal groundplane. The intersection of these two planes defines the 3D_line. The best intersection of this 3D_line with the three reference planes defines its origin. With reference to FIG. 18, in the 3D line filtering phase, each 3D_line can be updated on each frame after it is initialized if a history exists for frame $N_{new\_now\text{-}wait}$. An update state is calculated except for the history information used which is newer and only the intercept with the assigned reference plane is required. The new 3D_line state is combined with the previous state using a Kalman filter. The variances of the states are then examined to see if they have fallen below a preset threshold ($T_{qc}$). If a 3D_line passes this quality control check, it becomes a good_3D_line.

Figure 21:
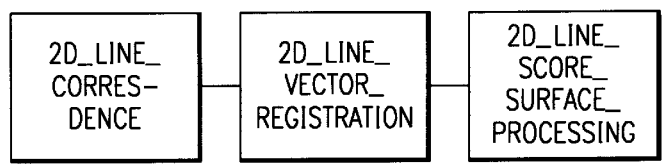
FIG. 21 is a schematic diagram showing the three sub-procedures required to generate the cross-range and down-range components of the aimpoint/trackpoint correction vector.
Figure 22A:
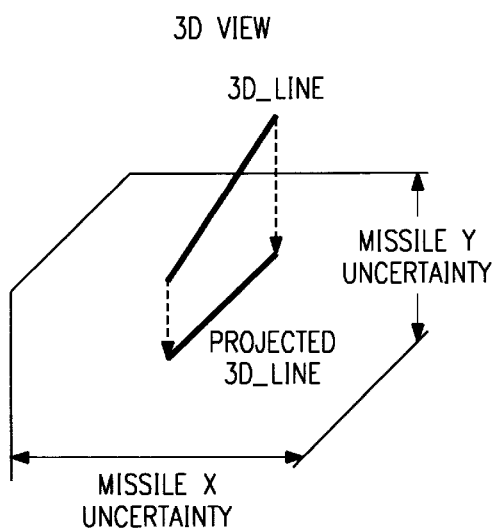
FIGS. 22(A) and (B) show the calculation of 2D_line_correspondence distance test with (A) showing the buffer box around the good_3D_line and (B) showing the intercept calculation with the parse_model_lines.
Figure 22B:
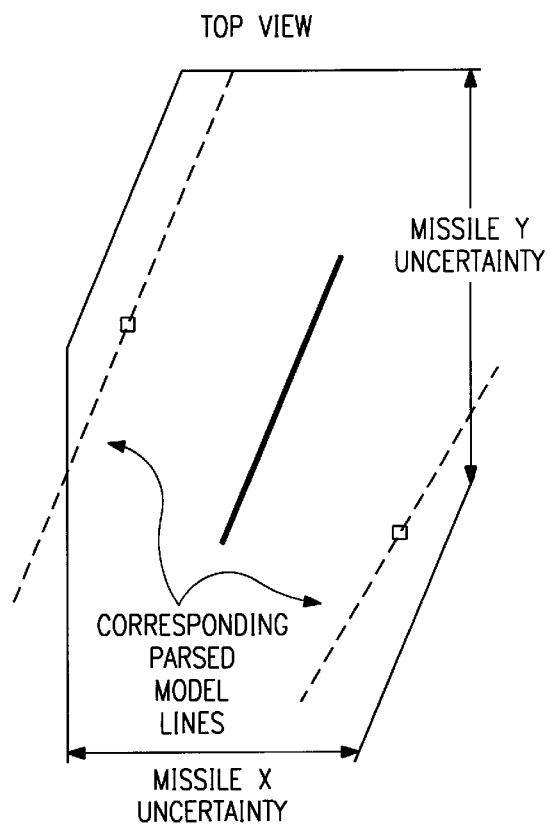

In the rotation error correction stage, all processing described in conjunction with the 3D line acquisition stage continues (i.e.,3DLOAL continues to update 3D_lines and find new lines). In addition, 3DLOAL begins the process of matching (or resolving transformation errors between) the set of good_3D_lines and a subset of the prebrief 3D_model_lines. This stage has four processing phases which are (1) pertubate model transformation, (2) parse prebrief model lines, (3) find line correspondences and (4) process angle error histograms. With reference to the first phase, because the exact orientation of the missile may not be known at the time the terminal coordinate system is defined, there will be rotation errors between the prebriefed model as it is transformed into the terminal coordinate system and the true orientation of the target area. The 3DLOAL algorithm generates perturbations to the ECEF_to_terminal direction cosine matrix on each frame during this stage of operation. The sequence of perturbations should cover a 99 percent confidence bound for the expected rotation transform errors. With reference to FIGS. 20 and 21, in the parse prebrief model lines phase, the 3DLOAL algorithm must extract those lines in the 3D prebrief_model which correspond to the area covered by the seeker footprint. To do this, all model lines are first transformed into the terminal coordinate system using the pertubated transform. Next, the sensor footprint on the current frame is projected into the terminal groundplane. All model lines whose 2D projections into the terminal groundplane (2_D_model_lines) are all or partially contained in the sensor footprint are found and, for this frame, these model_lines are marked as parsed_model_lines. With reference to FIGS. 21 and 22, in the phase of finding line correspondences, both 2D and 2D line correspondences are calculated to efficiently achieve an overall model to scene match. To find 2D correspondences, each good_3D_line and each parsed_model_line are projected into the terminal groundplane. For each projected good_3D_line, all projected parsed_model_lines which have the same angle ± some angle tolerance $T_\alpha$ are found. Next, a 2D search box is generated around each projected good_3D_line by extending its endpoints and its sides by the position uncertainty of the missile navigation and targeting error. All same angle projected parsed_model_lines that intersect any part of this region are found. The set of all such pairs of projected good_3D_lines matching projected parsed_model_lines constitute the 2D_line_correspondences for this frame. Similarly, to find 3D_line_correspondences, a two angle test must be passed and a search volume must be examined. In the phase of processing angle error histogram(s), according to its orientation, each 3D_line_correspondence can generate an angle difference measure for two of the three angle error histograms (row, pitch and yaw). Therefore, these angle error histograms are accumulated over the transformation perturbation sequence. At the end of the perturbation sequence, which marks the end of this stage, the histogram(s) are smoothed and their peak(s) are found. These peaks then become the estimate_roll_error, estimated_pitch_ error and estimated_yaw_ error between the model and the extracted scene. These estimates are applied to all subsequent model transformation in the lock-on stage.

With reference to FIGS. 21 to 27, in the translation error correction or lock-on stage, once the rotation portion of the model transformation error has been eliminated, the translation portion of the error can be found. To accomplish this, 3DLOAL performs a 2 stage vector registration. First, a 2D vector registration operates on the 2D_line_correspondence pairs and only calculates a 2D aimpoint_correction_vector or groundplane xy offset. Such an algorithm is set forth by Lundgren, Jim, "Registration Algorithm", March, 1993. Then, a 2½D vector registration algorithm adds the z component to the aimpoint_correction_vector. Only the top peaks generated by the 2D vector registration procedure are processed. When the value of the registration reaches some minimum value, 3DLOAL transitions to the terminal tracking stage. The following actions are involved in transition to track: (1) the aimpoint_correction_vector is added to the missile aimpoint location, (2) this new aimpoint is copied to the sensor staring point, (3) the aimpoint_correction_vector is mapped into the translation portion of the prebrief_model transformation and (4) the absolute location uncertainty is collapsed to the missile navigation drift plus sensor pointing error uncertainty.

In the terminal tracking stage, the 3DLOAL algorithm continues to execute all portions of the algorithm required to generate good_3D_lines and an aimpoint_correction_vector. It may, as an option, also continue to process updates to the estimated_yaw_error and/or estimated_pitch_error. In reality, terminal tracking is lock-on at a very high frame rate. The higher frame rate is achieved by two factors, these being (1) the navigation and targeting errors (and therefore correspondence regions) are greatly reduced a the lock on snapshot(s) and (2) the shrinking sensor footprint results in fewer model-lines being parsed. The only other difference is the set of parameters, i.e., $N_{wait}$, $N_{delete}$, $N_g$ are modified. This phase continues until a blind range is reached, at which time the missile finishes its flight via inertial navigation.

The above described procedure was implemented in a computer simulation and tested against a high resolution synthetic database representing a complex urban scene with an average aimpoint error of less than two meters.

The Appendix attached hereto is a 3DLOAL algorithm in accordance with the present invention which is the actual preferred embodiment.

Though the invention has been described with reference to a specific preferred embodiment, many variations and modifications thereof will immediately become apparent to those skilled in the art. It is therefore the intention that the appended claims be interpreted as broadly as possible in view of the prior art to include all such variations and modifications.

APPENDIX

The 3DLOAL algorithm is composed of two parts: 3D_PREBRIEFING or the target area processing that takes place before the missile is launched and 3D_LOAL that occurs after the missile is in flight.

Figure 1 - is a schematic diagram representing the two main parts of 3DLOAL system, i.e., 3D_PREBRIEFING and 3D_LOAL.

3D_PREBRIEFING:

A prebrief file or load module shall consist of the following items:

1) The 3D reference point of the prebrief in absolute earth coordinates (either ECEF or geodetic). This is also the trackpoint $[x_T \quad y_T \quad z_T]$.
2) Transformation DCM between local coordinate system and true earth coordinates, either $D_{E \rightarrow PB}$ or $D_{NED \rightarrow PB}$ depending on (1) above.
3) Distance (3D vector: $[x_A^{PB} \quad y_A^{PB} \quad z_A^{PB}]$ ) of aimpoint ( in meters) from prebrief reference point.
4) Number of model lines ( $N_{MODEL\_LINES}$ ).
5) Number of altitude reference lines ( $N_{ALT\_LINES}$ ).
6) List of 3D lines in form $\{[x_1^{PB} \quad y_1^{PB} \quad z_1^{PB}], [x_2^{PB} \quad y_2^{PB} \quad z_2^{PB}]\}$ where the two 3D vectors represent the two endpoints of the lines relative to the prebrief reference point. Altitude reference lines are at the top of the list.
7) Wireframe, Recon-Nadir, Recon-Non-Nadir switch.
8) Start range $T_{RANGE\_START}$, start altitude and approach heading.

It can be derived from two different sources.

Option 1) 3D model:

In this description (3D_wireframe_prebrief) each object in the target area is described by a set of 3D facets where each facet represents a part of an object. This wire frame model is displayed to the mission planner using standard computer graphics based software. The mission planner must decide on a 3D aimpoint, a 3D trackpoint relative to this 3D wire frame model and an approach direction and altitude for the missile flight path.

This information is entered interactively using standard computer software interfaces such as dialog boxes or mouse clicks. The mission planning software then performs the following tasks.

- Generates a perspective view of the 3D wire frame model from the estimated position of the first sensor snapshot ( $T_{RANGE\_START}$ ) using the field-of-view of the missile seeker [V].
- Removes hidden lines from this perspective view [V].
- Clips line endpoints which intersect the edge of the sensor field of view [V].
- Generates a list of the nonhidden, clipped lines in this view in the form $\{[x_1^{PB} \quad y_1^{PB} \quad z_1^{PB}], [x_2^{PB} \quad y_2^{PB} \quad z_2^{PB}]\}$.
- Translates these lines as distances relative to the 3D trackpoint (in meters).

- The line endpoints, aimpoint, trackpoint, and transformation to earth coordinates are written to the prebrief file.

All 3D lines generated in this fashion are considered to be altitude reference lines, i.e. $N_{ALT\_LINES} = N_{MODEL\_LINES}$.

Option 2) Reconnaisance photo:

In this description (recon_prebrief-nadir and recon_prebrief-non-nadir) a digitized overhead photo is available yielding a single 2D description of the target area. Along with this digitized photo is a camera model which describes the resolution and orientation of the camera at the time the photo was taken. The image is displayed to the mission planner using standard computer graphics display software.

1) First the image is processed for line features (see 2D_line_finding).
2) Then a trackpoint and an aimpoint are selected by clicking points in the image with a mouse.
3) The extracted lines within a distance $D_{CLIP}$ are then highlited on the computer. This distance is equal to the largest cross sectional area of the seeker footprint generated at $T_{START\_RANGE}$ plus 3X the standard deviation of the missile targeting uncertainty $[\sigma x_M \quad \sigma y_M \quad \sigma z_M]$ (see Parse_model_lines for a method to calculate these distances).
4) The mission planner then clicks on lines around the aimpoint to be used as altitude reference lines. The aimpoint altitude with respect to these lines is entered by the mission planner via a dialog box.
5) The line endpoints, aimpoint, trackpoint, and transformation to earth coordinates are written to the prebrief file.

3D_LOAL:

The inflight portion of the algorithm has 5 processing phases, they are:

1) 3D_LOAL_MIDCOURSE
2) 3D_LOAL_START
3) 3D_LOAL_ACQUIRE_3D_LINES
4) 3D_LOAL_LOCK_ON
5) 3D_LOAL_TRACK

Figure 2 - is a scematic diagram illustrating the five main processing phases of the 3DLOAL portion of the system. They are 3D_LOAL_MIDCOURSE, 3D_LOAL_START, 3D_LOAL_ACQUIRE_3D_LINES, 3D_LOAL_LOCK_ON, and 3D_LOAL_TRACK.

3D_LOAL_MIDCOURSE:

During this phase the missile flight guidance is provided by the missiles navigation hardware (GPS or inertial). Values supplied include the estimated missile position $[x_M \quad y_M \quad z_M]$, the estimated missile orientation referenced to absolute earth coordinates $D_{BODY \rightarrow E}$, and the estimated sensor pointing transformation referenced to absolute earth coordinates $D_{PLAT \rightarrow E}$. The missile is flown to a point which will provide an approach directly at the estimated trackpoint as determined by the missile internal guidance and at the height and approach angle determined by the mission planner. This point should be acheived beyond $T_{RANGE\_START}$. From this point on the missile flight path is shaped so that the missile is flying directly at the estimated trackpoint $[x_T \ y_T \ z_T]$ location and at a constant altitude. The missile sensor is pointed so that its boresight is colinear with the estimated Line-of-Sight LOS $\overline{[(x_T - x_M) \ (y_T - y_M) \ (z_T - z_M)]}$ vector to the trackpoint. Once the LOS range $(R_{LOS})$, calculated as:

$$R_{LOS} = \sqrt{\left((x_T - x_M)^2 + (y_T - y_M)^2 + (z_T - z_M)^2\right)}$$

between the estimated missile and estimated trackpoint falls below $T_{RANGE\_START}$ then the 3DLOAL_START stage begins.

Figure 3 illustrates the desired missile trajectory once 3D_LOAL starts and as related to the five processing phases.

3D_LOAL_START:

This phase should last for only one frame. Its purpose is to define a 3D reference system in which all 3D line extraction and matching calculations and all tracking propagation calculations will take place.

The missile orientation ECEF to body DCM ($D_{BODY \to E}'$) is used to define the terminal coordinate system as follows:

- The missile up vector in ECEF coordinates $[x_{UP}^E \ y_{UP}^E \ z_{UP}^E]$ is mapped to the terminal coordinate system -z vector.
- The component of the missile body vector parallel to the ground plane or down range vector in ECEF coordinates $[x_{DR}^E \ y_{DR}^E \ z_{DR}^E]$ is mapped into the terminal coordinate system x vector.
- The cross product of the terminal coordinate system ($x \otimes z$) vectors or cross range vector in ECEF coordinates $[x_{CR}^E \ y_{CR}^E \ z_{CR}^E]$ defines the third terminal coordinate system y vector.

The origin of the terminal coordinate system $[x_O^E \ y_O^E \ z_O^E]$ is the prebriefed trackpoint in ECEF coordinates $[x_T^E \ y_T^E \ z_T^E]$.

The terminal coordinate system to ECEF conversion transform $D_{E \to T}$ as well as the ECEF coordinate of the terminal coordinate system origin are saved. These values do not change for the remainder of 3D_LOAL.

The $D_{E \to T}$ DCM is calculated as follows:

$$D_{E \to T} = \begin{bmatrix} x_{DR}^E / dmag & y_{DR}^E / dmag & z_{DR}^E / dmag \\ x_{CR}^E / cmag & y_{CR}^E / cmag & z_{CR}^E / cmag \\ -x_{UP}^E / umag & -y_{UP}^E / umag & -z_{UP}^E / umag \end{bmatrix}$$

where dmag, cmag, and umag are the magnitudes of the downrange, crossrange, and up vectors respectively.

Also three reference planes ( $P_{H1}$ and $P_{H2}$ for horizontal oriented *3D_lines* and $P_V$ for vertical oriented *3D_lines* ) are calculated. $P_{H1}$ and $P_{H2}$ are parallel to the terminal coordinate z vector and form 45 degree angles with the x and y directions. $P_V$ is parallel to the terminal groundplane at some arbitrary height. All three planes intersect the terminal system origin $\begin{bmatrix} x_O^E & y_O^E & z_O^E \end{bmatrix}$. The terminal coordinate system and reference planes are illustrated graphically in figure 4.

Figure 4 illustrates the terminal coordinate system and its reference planes as established on the 3D_LOAL_START frame. All subsequent 3D_line creation processing will take place in this coordinate system.

3D_LOAL_ACQUIRE_3D_LINES:

The purpose of this phase is to generate $T_{NUM\_G\_LINES}$ number of well-behaved 3D_lines (good_3D_lines) for matching against the stored prebrief file. Four procedures are required to generate these 3D lines, they are:

1) 2D_line_finding
2) 2D_line_tracking
3) 3D_line_creation
4) 3D_line_filtering

Figure 5 is a schematic diagram of the 3D_LOAL_ACQUIRE_3D_LINES processing phase. This phase is where 3D_lines from the target scene are created and updated.

2D_line_finding

The 2D_line_finder procedure is executed on each array of sensor imagery at a fixed frame rate. Its function is to find linear objects in the imaged scene. There are many line-finders in the open literature that can be used [B] [S]. The line finder used needs to have the following properties:

1) Extracts *2D_lines* to sub-pixel accuracy,
2) Generates a defined phase feature,
3) Has degree of straightness control,
4) Has minimum length control.

Figure 6:
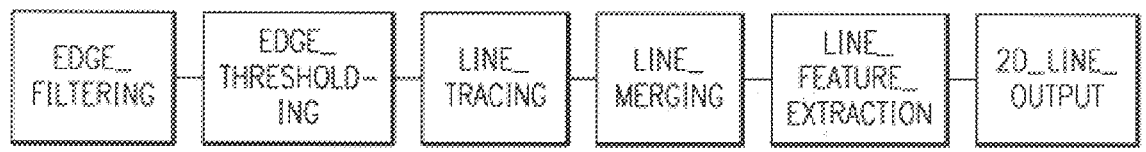
FIG. 6 is a schematic diagram showing procedures required to generate 3D_lines from a frame of sensor imagery.
Figure 7A:
FIG. 7(A) shows a sample sensor image with parts (B), (C) and (D) showing the resulting images and lines after the edge extraction, edge thresholding and line finding procedures have executed.
Figure 7B:
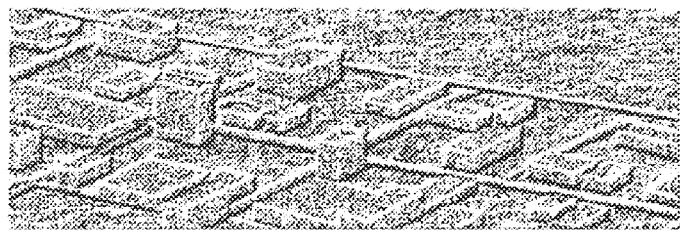
Figure 7C:
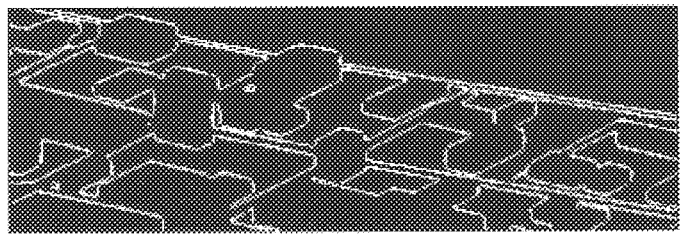
Figure 7D:
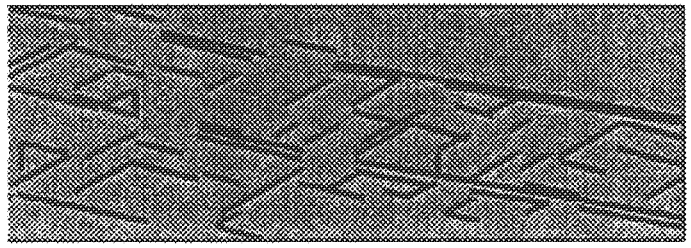

The 2D_line_finding procedure is composed of the following sub-procedures:

1) Edge_filtering
2) Edge_thresholding
3) Line_tracing
4) Line_feature extraction 5) Line_merging
6) 2D_line_output Figure 6 is a schematic diagram showing the 6 processing procedures required to generate 2D_lines from a frame of sensor imagery.

1) The Edge_filtering sub-procedure is a standard image processing technique well described in any image processing text. Three possible techniques are Roberts[J], Sobel[J], and Prewitt[J] operators. The output of this operation is an edge map of the original grayshade image - figure 7 part a. The preferred embodiment uses the Roberts operator. An example edge map is shown in figure[7] part b.

2) The Edge_thresholding sub-procedure is also a standard image processing technique. A histogram of the grayshades contained in the image output from the edge filtering step is calculated. Then the bin corresponding to a fixed percentile of edge grayshades is found. Finally all pixels in the edge image above this bin value are mapped to a "1" value, all edge pixels below this value are mapped to a "0" value. This produces a binary or "black/white" image. An example of the resulting binary image is shown in figure [7] part c.

3) The Line_tracing sub-procedure generates 2D_lines from the thresholded edge image. Their are many algorithms in the public domain which perform this function. The current embodiment uses an adaptation of the Vpolygon function from Khoros ® Public Domain software [K]. First the edge map is scaned for an edge "1" pixel. A line is then formed using neigboring "1" pixels, then all "1" pixels used in this line are remove from edge map (actually a path along the line is removed) from further consideration. The process is repeated for any remaining edge "1" pixels. When an edge "1" pixel is first identified it is used as a starting point to "trace out" a path through the edge map. It is first tested to see if it is a likely endpoint for a line. The path tracing proceeds as follows. From the startingpoint, the edge map is searched in every direction for neighboring edge "1" pixels. If a "1" pixel is found, it is added to a list and the process is repeated for the new pixel. This search is directed to the general direction indicated by the starting pixel. The search is continued while monitoring a maximum line distortion criteria which is calculated as the error between all pixels in the list, and a line defined by the current line endpoints (the starting pixel and the latest found pixel). The process is repeated until either this metric is exceeded or an edge of the image is reached. After the line is determined, a fixed percent of pixels are trimmed from the line in an effort to reduce an unwanted property of "turning a corner. An example of the resulting raw lines are shown in figure [7] part d.

Figure 7 part (a) shows a sample sensor image.; parts (b), (c), and (d) show the resulting images and lines after the edge extraction, edge thresholding and line finding procedures have executed.

4) The Line_feature_extraction sub-procedure generates phase or "direction information for each line generated by the line tracing sub-procedure. First the orientation of the line must be calculated. First calculate the average grayshade in a parallel area on each side of the line. Then choose the starting and stopping points so that the darker (or lighter) side is always on the right hand side of the direction of the line. The phase angle is calculated as the angle between the vertical raster of the image and the direction of the line. This angle is calculated to be between ± 180°. The direction and phase angle calculation are illustrated in figure 8.

Figure 8:
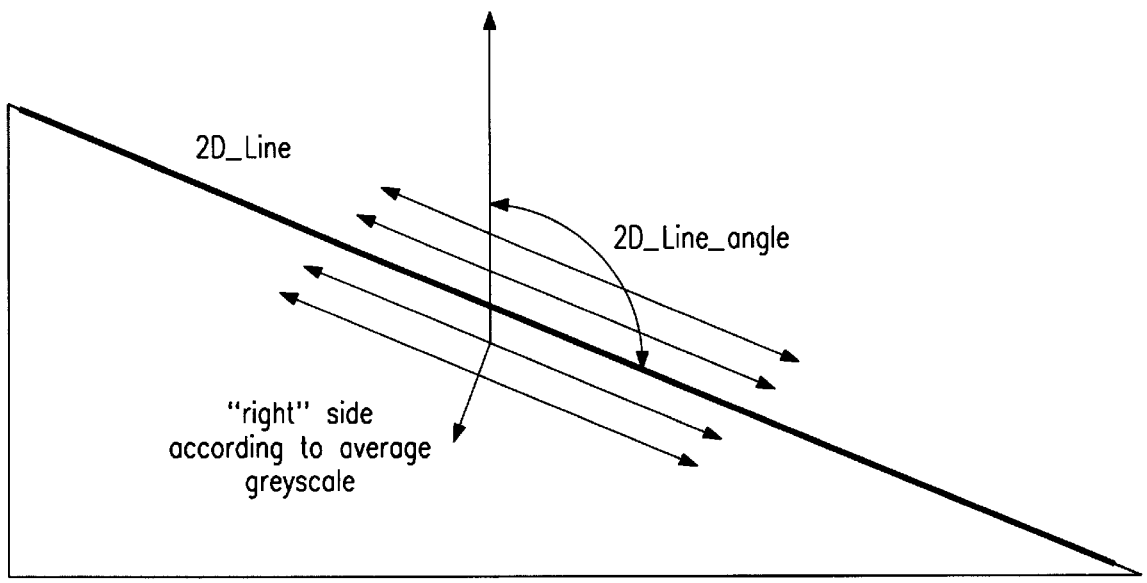
FIG. 8 illustrates the calculation of the phase angle for a single line.

Figure 8 illustrates the calculation of the phase angle for a single line.

Figure 9:
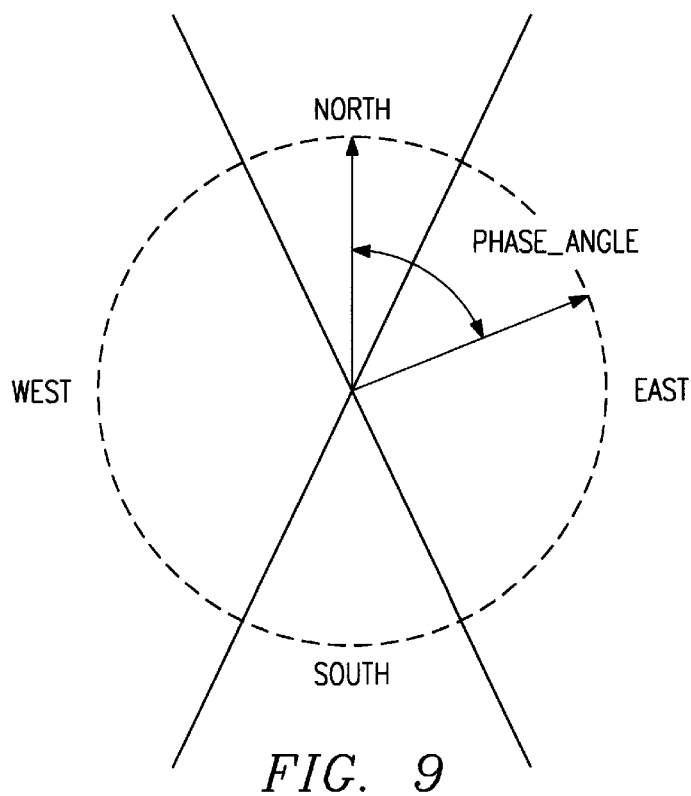
FIG. 9 illustrates a 4 quadrant phase feature implementation.

A line touch feature is also calculated. This feature is a true or false label attached to each line endpoint indicating whether the line endpoint is within $T_{TOUCH\_X}$ and $T_{TOUCH\_Y}$ pixels of the image boundary. This subprocedure also divides the list into $N_{PHASES}$ by the 2D_line_angle. The current embodiment divides lines into 4 phases: North, South, East and West. Figure 9 illustrates these four phases in image coordinates.

Figure 9 illustrates a 4 quadrant phase feature implementation.

5) The_line_merging sub-procedure examines the start and stop points of each line for possible merging with another line to make one longer line. Extend the stop points of each line in the direction of its phase angle $T_{GAP}$ pixels as shown in Figure 10 part a. Examine the start points of all other lines to see if they intersect exactly with this extended region, as illustrated in Figure 10 part b. If so merge these two lines such that the start and stop points of the new line are the start point of the first line and the stop point of the second line respectively. Recompute, the phase angle and touch values of the new line as before.

Figure 10 illustrates the line merging calculation, in part (a) the line extended a preset distance and in part (b) a mergable line is found.

6) The 2D_line_output sub-procedure sorts the lines by length and outputs upto $N_{MAX\_2D\_LINES}$ with features to the 2D_line_tracking phase. The list of features for each line contains:

2D_line_start_x (in pixels from the center of the image);
    2D_line_start_y (in pixels from the center of the image);
    2D_line_stop_x (in pixels from the center of the image);
    2D_line_stop_y (in pixels from the center of the image);
    2D_line_touch_start;
    2D_line_touch_stop;
    2D_line_angle;
    2D_line_phase;
    2D_line_length;

2D_line_tracking

The 2D_line_tracking procedure accumulates the trajectories of 2D_lines over several frames in the form of 2D_tracks. The 2D_line_tracking procedure is composed of the following sub-procedures:

1) 2D_dynamics_update
2) 2D_line_to_track
3) 2D_track_add_dynamics
4) 2D_track_propogate
5) 2D_track_association
6) 2D_track_measurement_update
7) 2D_track_delete
8) 2D_track_add_new_tracks
9) 2D_track_output Figure 11 is a schematic diagram showing the 9 processing procedures required to create 2D_tracks from 2D_lines.

1) The 2D_dynamics_update sub-procedure updates the missile location and pointing parameters with respect to the terminal coordinate system for the frame just processed in 2D_line_finding. The specific values updated are missile terminal position $\begin{bmatrix} x_M^T & y_M^T & z_M^T \end{bmatrix}$ and missile pointing angles pitch $(\alpha_P)$, yaw $(\alpha_Y)$, and roll $(\alpha_R)$ respectively. These parameters are illustrated graphically in figure 12 ( for this embodiment a roll stabilized sensor is assumed, thus $\alpha_R$ always equals 0).

Figure 12 illustrates the calculation of updated missile positions and sensor pointing angles in the terminal coordinate system.

The differences between the above parameters, $\begin{bmatrix} \Delta x_M^T & \Delta y_M^T & \Delta z_M^T \end{bmatrix}$ and $\Delta\alpha_P, \Delta\alpha_Y, \Delta\alpha_R$, from their previous values are also calculated and stored, along with the time difference, $\Delta T$, since the previous values were generated.

2) The 2D_line_to_track sub-procedure generates additional features for the 2D_lines which will be used in converting them to 2D_tracks. These values are a 2D_line position, and a 2D_line size. They are calculated in an angle space referenced to the zero yaw, zero pitch vector. The 2D_line start and stop points are also converted to an angle space representation. The following equations describe the above calculations:

$$2D\_line\_start\_x = 2D\_line\_start\_x * Ix_{fov} + y\alpha$$
$$2D\_line\_start\_y = 2D\_line\_start\_y * Iy_{fov} + p\alpha$$
$$2D\_line\_stop\_x = 2D\_line\_stop\_x * Ix_{fov} + y\alpha$$
$$2D\_line\_stop\_y = 2D\_line\_stop\_y * Iy_{fov} + p\alpha$$

$$2D\_line\_pos\_x = (2D\_line\_stop\_x + 2D\_line\_start\_x)/2$$
$$2D\_line\_pos\_y = (2D\_line\_stop\_y + 2D\_line\_start\_y)/2$$

$$2D\_line\_size\_x = |2D\_line\_stop\_x - 2D\_line\_start\_x|$$
$$2D\_line\_size\_y = |2D\_line\_stop\_y - 2D\_line\_start\_y|$$

where $Iy_{fov}$ and $Ix_{fov}$ are the vertical and horizontal instaneous FOV for a pixel.

3) The 2D_track_add_dynamics sub-procedure moves 2D_tracks generated on previous frames to the new frame using the delta values generated in 2D_dynamics_update. First the change due to seeker pointing is added for each existing 2D_track as:

$$2D\_track\_pos\_x = 2D\_track\_pos\_x + \Delta y\alpha$$

$$2D\_track\_pos\_y = 2D\_track\_pos\_y + \Delta p\alpha$$
$$2D\_track\_start\_x = 2D\_track\_start\_x + \Delta y\alpha$$
$$2D\_track\_start\_y = 2D\_track\_start\_y + \Delta p\alpha$$
$$2D\_track\_stop\_x = 2D\_track\_stop\_x + \Delta y\alpha$$
$$2D\_track\_stop\_y = 2D\_track\_stop\_y + \Delta p\alpha$$

Next the change due to missile motion is added. The 2D_track's position, start, and stop are projected into the groundplane at the previous missile position. The missile position is then moved to its new location. New angles relative to the new missile position are then calculated. These new angle values replace the previous 2D_track_pos, 2D_track_start, and 2D_track_stop values. The 2D_track_size is updated by multiplying it by the factor of range_old divided by range_new. These calculations are illustrated in figure 13.

Figure 13:
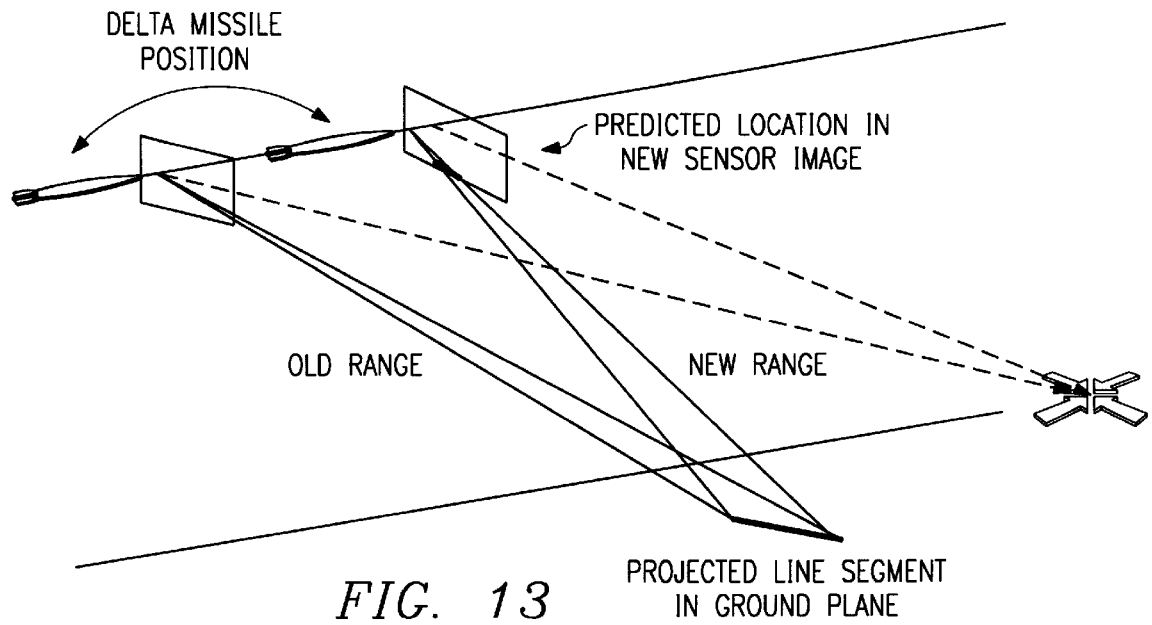
FIG. 13 illustrates how the change due to missile position and sensor pointing is used to propagate a 2D_track.

Figure 13 illustrates how the change due to missile position and sensor pointing is used to propagate a 2D_track.

A new 2D_track_angle calculation is also generated as:

$$2D\_track\_angle = a\tan 2\left(\frac{(2D\_track\_stop\_y - 2D\_track\_start\_y)}{(2D\_track\_stop\_x - 2D\_track\_start\_x)}\right).$$

4) The 2D_track_propogate sub-procedure moves 2D_tracks processed by 2D_add_dynamics if their filtered velocities become non zero. The new 2D_track position and start, stop point values are calculated as follows:

$$2D\_track\_pos\_x = 2D\_track\_pos\_x + 2D\_track\_vel\_x * \Delta T$$
$$2D\_track\_pos\_y = 2D\_track\_pos\_y + 2D\_track\_vel\_y * \Delta T$$
$$2D\_track\_start\_x = 2D\_track\_start\_x + 2D\_track\_vel\_x * \Delta T$$
$$2D\_track\_start\_y = 2D\_track\_start\_y + 2D\_track\_vel\_y * \Delta T$$
$$2D\_track\_stop\_x = 2D\_track\_stop\_x + 2D\_track\_vel\_x * \Delta T$$
$$2D\_track\_stop\_y = 2D\_track\_stop\_y + 2D\_track\_vel\_y * \Delta T$$

The variances are also propogated at this time as follows:

$$2D\_track\_pos\_\sigma^2 = 2D\_track\_pos\_\sigma^2 + \left(2 * \Delta T * 2D\_track\_pos\_vel\_\sigma^2\right) + \left(\Delta T^2 * 2D\_track\_vel\_\sigma^2\right) + \frac{\left(K\sigma_{pos\_proc}^{2} * \Delta T^3\right)}{6}$$

$$2D\_track\_pos\_vel\_\sigma^2 = 2D\_track\_pos\_vel\_\sigma^2 + \left(\Delta T * 2D\_track\_vel\_\sigma^2\right) + \frac{\left(K\sigma_{pos\_proc}^{2} * \Delta T^2\right)}{2}$$

$$2D\_track\_vel\_\sigma^2 = 2D\_track\_vel\_\sigma^2 + \left(K\sigma_{pos\_proc}^{2} * \Delta T\right)$$

$$2D\_track\_size\_\sigma^2 = 2D\_track\_size\_\sigma^2 + K\sigma_{size\_proc}^{2} * \Delta T$$

5) The 2D_track_association sub-procedure determines if 2D_lines from the most recent sensor image belong to previous 2D_tracks or should be used to initialize new 2D_tracks. This is accomplished as follows:

For each phase group of 2D_tracks search throught the list of same phase 2D_lines to find potential associations. Make sure all 2D_tracks and 2D_lines are examined. A potential associating 2D_line must meet the following criteria:

$$|2D\_track\_pos\_x - 2D\_line\_pos\_x| \leq 2D\_track\_size\_x/2 + T_{\Delta r}$$
$$|2D\_track\_pos\_y - 2D\_line\_pos\_y| \leq 2D\_track\_size\_y/2 + T_{\Delta r}$$
$$|2D\_track\_angle - 2D\_line\_angle| \leq T_{\Delta a}$$

For each 2D_track/2D_line pair meeting the above criteria calculate the intersection of the normal vector of the 2D_track eminating from the 2D_track_pos point and the line defined by the eqaution of the 2D_line. This calculation is illustrated graphically in figure 14 part a. Next determine if this intersection point actually lies on the 2D_line. If it does continue processing this potential association pair, if it does not do not consider this pair for association. Next calculate the distance (2D_t2l) from 2D_track_pos to the intersection point (see figure 14 part b). For each pair whose track normal intersection distance meets the following criteria:

$$2D\_t2l\_x \leq T_{\Delta r} \text{ and } 2D\_t2l\_y \leq T_{\Delta r}$$

calculate the percent overlap between the 2D_track and 2D_line. There are two overlap calculations: one is the projection of the 2D_track onto the 2D_line and the other is the projection of the 2D_line onto the 2D_track. They are referred to as overlap_t2l and overlap_l2t respectively. Figure 14 part c illustrates this concept.

Figure 14 is an illustration of the 2D_track/2D_line merging criteria. Part (a) shows the normal calculation between the 2D_track and 2D_line, part (b) shows the distance calculation between the two, and part (c) shows the percent overlap calculation.

Now calculate an overall distance measure for the 2D_track/2D_line pair as:

$$Dist = Kd * \frac{|2D\_t2l\_x| + |2D\_t2l\_y|}{T\_pos\_x\_\Delta + T\_pos\_y\_\Delta} + Ka * \frac{|2D\_track\_angle - 2D\_line\_angle|}{T\_2D\_angle\_\Delta}$$

where Ka and Kd are preset weights. The 2D_line generating the smallest Dist value becomes the "best associated" 2D_line. Using the best associated 2D_line generate 2D_track values:

$$2D\_track\_pos\_x\_res = 2D\_t2l\_x$$
$$2D\_track\_pos\_y\_res = 2D\_t2l\_y$$
$$2D\_track\_overlap\_t2l = overlap\_t2l$$
$$2D\_track\_overlap\_l2t = overlap\_l2t$$

Complete 2D_track_association with the following actions:

- Mark the 2D_track as ASSOCIATED and link it to its "best associated" 2D_line.
- Mark all 2D_lines which are associated as ASSOCIATED on this frame.

Update the 2D_track_age value by 1 frame and update the 2D_track_update_frame to indicate the current frame.
- If the 2D_track is marked as NEW and has been associated in $T_{N\_confirm}$ of the first $T_{M\_confirmed}$ frames then also mark this 2D_track as CONFIRMED.

All 2D_tracks which associate and have been marked as CONFIRMED on the previous frame continue to be marked as CONFIRMED on this frame.

All 2D_tracks which have been marked as CONFIRMED on the previous frame and do not associate on this frame are marked as COASTING.

If the 2D_line and 2D_track sizes are within a fixed percentage $T_{OVERLAP\_PCT}$ of each other then remove the 2D_line from further consideration for association with other 2D_tracks.

- For 2D_tracks which are associated on this frame, if the overlap_l2t value is equal to 1 then the 2D_track_size x and y values are unchanged; if overlap_l2t is less than 1 then the 2D_track_size x and y values are scaled by the overlap_l2t value.

6) The 2D_track_measurement_update sub-procedure incorporates the new measurements from associated 2D_lines into the states of the associated 2D_tracks. The preferred embodiment uses a Kalman filter method[M] for the position, velocity and size state updates and an alpha filter method for the angle state updates. Measurement update is only performed on 2D_tracks which are marked ASSOCIATED on this frame. The 2D_line measurements are from the linked "best associated" 2D_lines from the 2D_track_association sub-procedure.

Kalman filter update method for 2D_track position and velocity:

First update the residual variances:

$$\sigma_r^2 = 2D\_track\_pos\_\sigma^2 + K\sigma_{POS\_MEAS}^2$$
$$2D\_track\_pos\_res\_err = \sqrt{\sigma_r^2}$$

Next update the Kalman gains:

$$K_{g1} = 2D\_track\_pos\_\sigma^2 / \sigma_r^2$$
$$K_{g2} = 2D\_track\_pos\_vel\_\sigma^2 / \sigma_r^2$$

Apply the Kalman gains to the innovations to get new position and velocity values:

$$2D\_track\_pos\_x = 2D\_track\_pos\_x + K_{g1} * 2D\_track\_pos\_x\_res$$
$$2D\_track\_pos\_y = 2D\_track\_pos\_y + K_{g1} * 2D\_track\_pos\_y\_res$$

$$2D\_track\_vel\_x = 2D\_track\_vel\_x + K_{g2} * 2D\_track\_pos\_x\_res$$
$$2D\_track\_vel\_y = 2D\_track\_vel\_y + K_{g2} * 2D\_track\_pos\_y\_res$$

Finally update the position and velocity variance values:

$$2D\_track\_pos\_\sigma^2 = K_{g1} * K\sigma_{POS\_MEAS}^2$$

$$2D\_track\_vel\_\sigma^2 = \frac{2D\_track\_vel\_\sigma^2}{\sigma_r^2} - 2D\_track\_pos\_vel\_\sigma^2 * K_{x2}$$

$$2D\_track\_pos\_vel\_\sigma^2 = K_{x2} * K\sigma^2_{POS\_MEAS}$$

Kalman filter update method for 2D_track size update:

First update the residual variance:

$$\sigma_r^2 = 2D\_track\_size\_\sigma^2 + K\sigma^2_{SIZE\_MEAS}$$

$$2D\_track\_size\_res\_err = \sqrt{\sigma_r^2}$$

Next calculate the Kalman gain:

$$K_{g1} = 2D\_track\_size\_\sigma^2 / \sigma_r^2$$

Apply the Kalman gain to the innovations to get the new size states:

$$2D\_track\_size\_x = 2D\_track\_size\_x + K_{g1} * (2D\_track\_size\_x - 2D\_line\_size\_x)$$
$$2D\_track\_size\_y = 2D\_track\_size\_y + K_{g1} * (2D\_track\_size\_y - 2D\_line\_size\_y)$$

Update the size variance values:

$$2D\_track\_size\_\sigma^2 = K_{g1} * K\sigma^2_{SIZE\_MEAS}$$

The angle update uses an alpha filter technique as follows:

$$2D\_track\_angle = 2D\_line\_angle + K_\alpha * (2D\_track\_angle - 2D\_line\_angle)$$

where $K_\alpha$ is a preset constant.

7) The 2D_track_delete sub-procedure removes 2D_tracks from the 2D_track list. There are three types of deletions: COAST, NEW, and FORCED.

- Delete all NEW 2D_tracks which have not been CONFIRMED after $T_{M\_CONFIRMED}$ frames by freeing the computer memory which stored their values.
- Delete all 2D_tracks which have been marked COAST for $T_{TRACK\_DELETE}$ frames by freeing the computer memory which stored their values.
- Delete all 2D_tracks when the 2D_DELETE_ALL or the 3D_LOAL_RESTART value is set to TRUE by freeing the computer memory which stored their values. The 2D_DELETE_ALL value will usually be set only if a large sensor slew is expected.

8) The 2D_track_add_new_tracks sub-procedure creates NEW 2D_tracks out of 2D_lines which are not associated on the current frame. For each 2D_line not associated in the 2D_track_association sub-procedure on this frame allocate a space in computer memory for a 2D_track and assign it the following measurements.

$2D\_track\_state = NEW$ $2D\_track\_count = 1$ $2D\_track\_last\_update\_frame = current\_frame$ $2D\_track\_index = current\_track\_index$ $2D\_track\_coast\_count = 0$ $2D\_track\_pos\_x = 2D\_line\_pos\_x$ $2D\_track\_pos\_y = 2D\_line\_pos\_y$ $2D\_track\_start\_x = 2D\_line\_start\_x$ $2D\_track\_start\_y = 2D\_line\_start\_y$ $2D\_track\_stop\_x = 2D\_line\_stop\_x$ $2D\_track\_stop\_y = 2D\_line\_stop\_y$ $2D\_track\_size\_x = 2D\_line\_size\_x$ $2D\_track\_size\_y = 2D\_line\_size\_y$ $2D\_track\_angle = 2D\_line\_angle$ $2D\_track\_phase = 2D\_line\_phase$ $2D\_track\_vel\_x = 0$ $2D\_track\_vel\_y = 0$ $2D\_track\_vel\_\sigma^2 = K\sigma^2_{VEL\_INIT}$ $2D\_track\_pos\_\sigma^2 = K\sigma^2_{POS\_INIT}$ $2D\_track\_pos\_vel\_\sigma^2 = 0$ $2D\_track\_size\_\sigma^2 = K\sigma^2_{SIZE\_INIT}$ Increment the *current_track_index* by 1 after the addition of each 2D_track.

9) The 2D_track_output sub-procedure outputs upto $N_{MAX\_2D\_TRACKS}$ to the 3D_line_creation procedure.

3D_line_creation

The 3D_line_creation procedure converts 2D_tracks to 3D_lines and then continues to update the 3D_line measurements as the 2D_tracks are updated. The 3D_line_creation procedure is composed of the following sub-procedures:

1) 3D_parameter_store
2) 3D_init_test
3) 3D_line_assocoation
4) 3D_line_init_planes
5) 3D_line_init_lines
6) 3D_line_delete_lines
7) 3D_line_add_new_lines Figure 15 is a schematic diagram showing the 7 processing procedures required to turn 2D_tracks into 3D_lines.

1) The 3D_parameter_store sub-procedure buffers up the missile and seeker pointing parameters, as defined relative to the terminal coordinate system, for each frame on which CONFIRMED 2D_tracks are output to the 3D_line_creation procedure. These values are indexed by a frame_count_index which is incremented each time the 3D_line_creation procedure is executed. Also a 3D_init_lines value is allocated for each frame and assigned a value of FALSE.

2) The 3D_init_test sub-procedure compares the current sensor pointing vector with pointing vectors from previous frames to see if a minimum change in viewing angle criteria has been met. For each previous frame that passes this test its 3D_init_lines value is set to TRUE and a frame_$\Delta$_index value is assigned as (current_frame_count-previous_frame_count). Once a frame's 3D_init_lines value has been set to TRUE it is no longer tested. Figure 16 graphically illustrates the calculation of the delta change in viewing angle between two randon frames.

Figure 16 illustrates the change in perspective test used to determine when a 3D_line can be initialized.

3) The 3D_line_association sub-procedure associates incoming 2D_tracks with pre-existing 3D_lines. A 3D_line inherits its index from its initiating 2D_track, therefore 3D_line_association is simply a matching process which matchs all 2D_track indexes to all existing 3D_line indexes. 2D_tracks and 3D_lines which are matched are marked as CLAIMED for this frame. For each 2D_track/3D_line match pair the values start_x, start_y, stop_x, and stop_y are copied from the 2D_track's associated 2D_line to the 3D_lines endpoint buffer and then indexed with the current frame index. Also, the buffer is marked as USED for this frame. All 3D_lines which do not associate have their current buffers marked as UNUSED. All 2D_tracks which do not associate are marked as UNCLAIMED.

4) The 3D_line_init_plane sub-procedure calculates an initializing plane $P_{INIT}$ for each NEW 3D_line. The plane is composed of the following 3 points show in matrix form:

$$P_{INIT} = \begin{bmatrix} x_M^T & x_{GSTART}^T & x_{GSTOP}^T \\ y_M^T & y_{GSTART}^T & y_{GSTOP}^T \\ z_M^T & 0 & 0 \end{bmatrix}$$

where point GSTART and GSTOP are the intersection of the groundplane with the projection of the 2D_line_start and 2D_line_stop points respectively. The projection is illustrated graphically in figure [17]. $P_{INIT}$ is stored in the 3D_line's init_plane_buffer for later use. Each NEW 3D_line is marked as P_INITTED after this procedure is executed.

Figure 17 illustrates the calculation of the init plane for a 3D_line using the missile position and the projection of the line endpoints into the groundplane.

5) The 3D_line_init sub-procedure checks CLAIMED 3D_lines which are P_INITTED to see if their corresponding 3D_init_value (frame on which it was added) has been marked TRUE by the 3D_init_test sub-procedure and if it has it generates the initial full 3D line value for it. To calculate a 3D line first a 3D orientation or slope must be calculated. To do this another plane $P_{NEW}$, is calculated as described for $P_{INIT}$ using the current missile position and current 2D_line start and stop points. The geometric intersection of the new plane and the init plane is a 3D line.

To calculate this intersection the coefficients A, B, C, and D of each plane and the three reference planes must first be found (note the three sets of reference plane coefficients need to only be calculated once and stored). For example, the $P_{NEW}$ coefficients $[A \ B \ C \ D]_{NEW}$ can be calculated as follows:

$$A = \det\left(\begin{bmatrix} y_M^T & z_M^T & 1 \\ y_{START}^T & 0 & 1 \\ y_{STOP}^T & 0 & 1 \end{bmatrix}\right); \ B = -\det\left(\begin{bmatrix} x_M^T & z_M^T & 1 \\ x_{START}^T & 0 & 1 \\ x_{STOP}^M & 0 & 1 \end{bmatrix}\right);$$

$$C = \det\left(\begin{bmatrix} x_M^T & y_M^T & 1 \\ x_{START}^T & y_{START}^T & 1 \\ x_{STOP}^T & y_{STOP}^T & 1 \end{bmatrix}\right); \ D = -\det\left(\begin{bmatrix} x_M^T & y_M^T & z_M^T \\ x_{START}^T & y_{START}^T & 0 \\ x_{STOP}^T & y_{STOP}^T & 0 \end{bmatrix}\right).$$

Next, find the normal vectors for each plane. For example, the normal vector $\bar{n}_{NEW}$ for the $P_{NEW}$ plane can be calculated as follows:

$$\bar{n}_{NEW} = [A \ B \ C]_{NEW} \Big/ \| [A \ B \ C]_{NEW} \|$$

Next find the slope $\bar{s}_{3D\_LINE}$ of the 3D line intersection which is equal to the normalized cross product of $\bar{n}_{NEW}$ and $\bar{n}_{INIT}$. Next calculate the incidence angles between the slope $\bar{s}_{3D\_LINE}$ and the three reference plane normal vectors as follows:

$$\alpha_{PH1} = \arccos(|\bar{n}_{PH1} \bullet \bar{s}_{3D\_LINE}|)$$
$$\alpha_{PH2} = \arccos(|\bar{n}_{PH2} \bullet \bar{s}_{3D\_LINE}|)$$
$$\alpha_{PV} = \arccos(|\bar{n}_{PV} \bullet \bar{s}_{3D\_LINE}|)$$

Next find the angle with the minimum value; the plane generating this angle becomes the reference plane for this particular 3D_line. Next calculate the intercept point $\bar{i}_{3D\_LINE}$ as follows:

$$\bar{i}_{3D\_LINE} = (AA^{-1}) * (DD)$$

where, $$AA = \begin{bmatrix} [A & B & C]_{NEW} \\ [A & B & C]_{INIT} \\ [A & B & C]_{REF} \end{bmatrix} \quad \text{and} \quad DD = \begin{bmatrix} -D_{NEW} \\ -D_{INIT} \\ -D_{REF} \end{bmatrix}$$

Finally, to complete the definition of the 3D line, its 3D endpoints must be calculated. These endpoints will be represented by two distances $d_{START}$ and $d_{STOP}$ from the intercept point in the direction of the 3D lines slope. First calculate 2 bounding planes $P_{START}$ and $P_{STOP}$ using the current missile position, the projected 2D_line endpoints in the ground plane, and the projected missile position in the groundplane. In matrix form these planes are:

$$P_{START} = \begin{bmatrix} x_M^T & x_{GSTART}^T & x_M^T \\ y_M^T & y_{GSTART}^T & y_M^T \\ z_M^T & 0 & 0 \end{bmatrix} \quad \text{and} \quad P_{STOP} = \begin{bmatrix} x_M^T & x_{GSTOP}^T & x_M^T \\ y_M^T & y_{GSTOP}^T & y_M^T \\ z_M^T & 0 & 0 \end{bmatrix}$$

Also, calculate the coefficients, $[A \quad B \quad C \quad D]_{START}$ and $[A \quad B \quad C \quad D]_{STOP}$, for these two planes as before. The plane_line intercept distance $d_{START}$ for the $P_{START}$ plane is calculated as follows:

$$d_{START} = sign(t) * \|\bar{s}_{3D\_LINE} * t\|$$

where $$t = -\left( \left( [A \quad B \quad C]_{START} * \bar{i}_{3D\_LINE} + D_{START} \right) \big/ \left( [A \quad B \quad C]_{START} * \bar{s}_{3D\_LINE} \right) \right).$$

The $d_{STOP}$ value for the $P_{STOP}$ plane is calculated similarly. Finally the eight state vector $\{x_S, y_S, z_S, \dot{x}_S, \dot{y}_S, \dot{z}_S, d_{START}, d_{STOP}\}_{INIT}$ composed of $\bar{s}_{3D\_LINE}$, $\bar{i}_{3D\_LINE}$, $d_{START}$ and $d_{STOP}$ respectively is stored as the initial 3D line estimate for this 3D_line. The 3D_line is marked as L_INITTED. Note, a 3D_line cannot be P_INITTED and L_INITTED on the same frame.

6) The 3D_line_delete sub-procedure removes 3D_lines from the 3D_lines list. There are two types of deletions: UNCLAIMED and FORCED.

- Delete all 3D_lines which go UNCLAIMED for $T_{3D\_DELETE}$ frames by freeing the computer memory which stored their values.

- Delete all 3D_lines when the 3D_DELETE_ALL or the 3D_LOAL_RESTART value is set to TRUE by freeing the computer memory which stored their values. The 3D_DELETE_ALL value will usually be set only if a large sensor slew is expected.

7) The 3D_line_add_new_lines sub-procedure creates NEW 3D_lines out of 2D_tracks which are not claimed on the current frame. For each 2D_track not claimed in the 3D_line_association sub-procedure on this frame allocate a space in computer memory for a 3D_line and assign it the following measurements.

$$3D\_line\_index = 2D\_track\_index$$
$$3D\_line\_state = NEW$$
$$3D\_line\_status = UNCLAIMED$$
$$3D\_line\_init\_frame = current\_frame$$
$$3D\_line\_update\_count = 0$$
$$3D\_line\_last\_update\_frame = current\_frame$$
$$3D\_line\_ref\_plane = UNKNOWN$$
$$3D\_line\_phase = 2D\_track\_phase$$
$$3D\_line\_start\_x = 2D\_line\_start\_x_{best\_associated}$$
$$3D\_line\_start\_y = 2D\_line\_start\_y_{best\_associated}$$
$$3D\_line\_stop\_x = 2D\_line\_stop\_x_{best\_associated}$$
$$3D\_line\_stop\_y = 2D\_line\_stop\_y_{best\_associated}$$
$$3D\_line\_P_{COV} = K\sigma_P^2$$
$$3D\_line\_Q\_\sigma^2 = K\sigma_Q^2$$
$$3D\_line\_R\_\sigma^2 = K\sigma_R^2$$

3D_line_filtering

The 3D_line_filtering procedure incorporates updates into the 3D line states using Kalman filtering. It also performs a quality control check on the states to see if the 3D line values are stable enough to output to the 3D_LOAL_LOCK_ON phase. The 3D_line_filtering procedure is composed of the following sub-procedures:

1) 3D_line_update
2) 3D_line_QC
3) 3D_line_output

Figure 18 is a schematic diagram of the 3 sub-procedures required to filter 3D_lines so that they become good_3D_lines and can be used in the model matching phase of 3D_LOAL.

1) The 3D_line_update sub-procedure executes on 3D_lines which have L_INITTED status and are CLAIMED on the current frame (note a 3D_line cannot be L_INITTED and be UPDATED on the same frame. First calculate a new state vector $\{x_s, y_s, z_s, x_s, y_s, z_s, d_{START}, d_{STOP}\}_{NEW}$ for the plane defined on the current frame and the plane defined on the frame equal to (current_frame-frame_Δ_index). The value of frame_Δ_index used for this line is retrieved from the parameter store buffer corresponding to the $3D\_line\_init\_frame$ value.

Once the new 3D line states are calculated they are added to the old states using a Kalman filter.

First, update the conditional covariance and Kalman gain values. In this embodiment the line states are treated as independent and therefore the same covariance and Kalman gain is used for each state. The updates are as follows:

$$P_{COV}^{NEW} = 3D\_line\_P_{COV} + 3D\_line\_Q\_\sigma^2 \text{ and}$$
$$K_G^{NEW} = P_{COV}^{NEW} / \left(P_{COV}^{NEW} + 3D\_line\_R\_\sigma^2\right).$$

Next calculate the innovations or error sequence as:

$$\begin{bmatrix} x_S \\ y_S \\ z_S \\ x_I \\ y_I \\ z_I \\ d_{START} \\ d_{STOP} \end{bmatrix}_{ERROR} = \begin{bmatrix} x_S \\ y_S \\ z_S \\ x_I \\ y_I \\ z_I \\ d_{START} \\ d_{STOP} \end{bmatrix}_{NEW} - \begin{bmatrix} x_S \\ y_S \\ z_S \\ x_I \\ y_I \\ z_I \\ d_{START} \\ d_{STOP} \end{bmatrix}_{OLD}$$

This error vector is combined with the new state value as follows. It is also saved for use in the 3D_line_QC sub-procedure. The new filtered state values are calculated as follows:

$$\begin{bmatrix} x_S \\ y_S \\ z_S \\ x_I \\ y_I \\ z_I \end{bmatrix}_{FILTERED} = \begin{bmatrix} x_S \\ y_S \\ z_S \\ x_I \\ y_I \\ z_I \end{bmatrix}_{NEW} + K_G^{NEW} * \begin{bmatrix} x_S \\ y_S \\ z_S \\ x_I \\ y_I \\ z_I \end{bmatrix}_{ERROR}$$

Note, new $d_{START}$ and $d_{STOP}$ states are only calculated if the $2D\_line\_touch\_start$ and $2D\_line\_touch\_stop$ values from the current frame are not TRUE for the 2D_line associated with this 3D_line on this frame. If the touch values are not TRUE then $d_{START}$ and $d_{STOP}$ are filtered as follows:

$$[d_{START}]_{FILTERED} = [d_{START}]_{NEW} + K_G^{NEW} * [d_{START}]_{ERROR}$$

$$[d_{STOP}]_{FILTERED} = [d_{STOP}]_{NEW} + K_G^{NEW} * [d_{STOP}]_{ERROR}$$

Complete the filter update by calculating the covariance update:

$$3D\_line\_P_{COV} = (1 - K_G^{NEW}) * P_{COV}^{NEW}$$

Finally copy the new filtered states into the 3D line state for possible use in the 3D_LOAL_LOCK_ON phase and mark the 3D_line as UPDATED. Also save the update covariance values for usage on next update.

2) The 3D_line_QC sub-procedure examines the error vector generated for 3D_lines which have been updated and decides if they should become good_3D_lines.

For each 3D_line marked as UPDATED calculate the four percent error values: $e_S$, $e_I$, $e_N$, $e_{START}$, and $e_{STOP}$; for slope, intercept, norm, $d_{START}$, and $d_{STOP}$ errors respectively. These error values are calculated as follows:

$$e_S = 100 * \left\| [x_S \quad y_S \quad z_S]_{ERROR} \right\|$$

$$e_I = 100 * \left\| [x_I \quad y_I \quad z_I]_{ERROR} \right\| / R_{LOS}$$

$$e_S = 100 * \left(1 - \left\| [x_S \quad y_S \quad z_S]_{ERROR} \right\|\right)$$

$$e_{START} = 100 * [d_{START}]_{ERROR} / R_{LOS}$$

$$e_{STOP} = 100 * [d_{STOP}]_{ERROR} / R_{LOS}$$

The line is a good_3D_line if the following conditions are all met.

For a 3D_line using the $P_V$ reference plane:

$$e_S \leq T_{SLOPE\_TEST\_V}$$
$$e_I \leq T_{INTCPT\_TEST\_V}$$
$$e_N \leq T_{NORM\_TEST\_V}$$
$$e_{START} \leq T_{START\_TEST\_V}$$
$$e_{STOP} \leq T_{STOP\_TEST\_V}$$

For a 3D_line using the $P_{H1}$ or $P_{H2}$ reference plane:

$$e_S \leq T_{SLOPE\_TEST\_H}$$
$$e_I \leq T_{INTCPT\_TEST\_H}$$
$$e_N \leq T_{NORM\_TEST\_H}$$
$$e_{START} \leq T_{START\_TEST\_H}$$
$$e_{STOP} \leq T_{STOP\_TEST\_H}$$

Mark each line passing the above test as GOOD for this frame.

3) The 3D_line_output sub-procedure outputs upto $N_{MAX\_GOOD\_3D\_LINES}$ to the 3D_LOAL_LOCK_ON phase. Only the most recent "good" update of the good_3D_line line is output.

Figure 19:
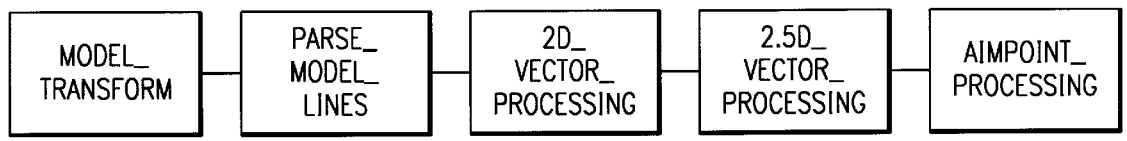
FIG. 19 is a schematic diagram of the 3D_LOAL_LOCK_ON phase where 3D_lines from the scene are matched to lines in the prebrief and a missile guidance correction is first generated.

3D_LOAL_LOCK_ON:

The purpose of this phase is to match the good_3D_lines with the prebrief file and generate a gross correction to the missile navigation error with respect to the prebriefed trackpoint/aimpoint. It runs in addition to the 3D_LOAL_ACQUIRE_LINES phase. It becomes active once $T_{NUM\_G\_LINES}$ of good_3D_lines are generated. It is not required to run on every frame but does in the current embodiment. It must complete before $R_{LOS}$ falls below the missile airframe maneuver limits $T_{RANGE\_TRACK}$ for correcting the maximum possible trackpoint/aimpoint error. This value is missile airframe dependent. Five procedures are required to generate the match, they are:

1) model_transform
2) parse_model_lines
3) 2D_vector_processing
4) 2.5D_vector_processing
5) aimpoint_processing Figure 19 is a schematic diagram of the 3D_LOAL_LOCK_ON phase. This is where 3D_lines from the scene are matched to lines in the prebrief and a missile guidance correction is first generated.

model_transform

The model_transform procedure maps the prebrief lines to the coordinate system in which the matching process is to be executed. In the case of 3D_wireframe_prebrief or recon_prebrief-nadir this matching will take place in the terminal coordinate system. In the case of a recon_prebrief-non-nadir the matching will take place in the prebrief (or camera) image plane. The transformation of model lines to the matching coordinate system needs to be executed only once. The model_transform procedure is composed of the following subprocedures:

1. model_pb_to_term_transform
2. good_3D_line_to_pb_transform
3. model_line_prep 1) The model_pb_to_term_transforms is executed for 3D_wire_frame prebriefs and 2D_nadir prebriefs. It transforms the aimpoint and model lines into the terminal coordinate system as follows:

for the aimpoint:

$$\begin{bmatrix} x_A^T \\ y_A^T \\ z_A^T \end{bmatrix} = D_{E \to T} * D_{PB \to E} * \begin{bmatrix} x_A^{PB} \\ y_A^{PB} \\ z_A^{PB} \end{bmatrix},$$

for each model line:

$$\begin{bmatrix} x_1^T \\ y_1^T \\ z_1^T \end{bmatrix} = D_{E \to T} * D_{PB \to E} * \begin{bmatrix} x_1^{PB} \\ y_1^{PB} \\ z_1^{PB} \end{bmatrix} \text{ and } \begin{bmatrix} x_2^T \\ y_2^T \\ z_2^T \end{bmatrix} = D_{E \to T} * D_{PB \to E} * \begin{bmatrix} x_2^{PB} \\ y_2^{PB} \\ z_2^{PB} \end{bmatrix}.$$

Since the trackpoint, the terminal coordinate system origin, and the camera system origin are all the same point only rotations need to be calculated.

2) The good_3D_line_term_to_pb_transform subprocedure is executed for recon_prebrief-non-nadir missions. It must be executed on each 3D_LOAL_LOCK_ON frame. It transforms the current good_3D_lines into the prebrief or matching coordinate system as follows for each good_3d_line:

$$\begin{bmatrix} x_{START}^{PB} \\ y_{START}^{PB} \\ z_{START}^{PB} \end{bmatrix} = D_{PB \to E}' * D_{E \to T}' * \begin{bmatrix} x_{START}^T \\ y_{START}^T \\ z_{START}^T \end{bmatrix} \text{ and } \begin{bmatrix} x_{STOP}^{PB} \\ y_{STOP}^{PB} \\ z_{STOP}^{PB} \end{bmatrix} = D_{PB \to E}' * D_{E \to T}' * \begin{bmatrix} x_{STOP}^T \\ y_{STOP}^T \\ z_{STOP}^T \end{bmatrix}$$

Again, since the trackpoint, the terminal coordinate system origin, and the camera system origin are all the same point only rotations need to be calculated.

After either sub-procedure 1 or 2 is executed the parsed_model_lines and good_3d_lines are in the correct coordinate system for matching.

3) The model_prep sub-procedure calculates a length $m\_line_L$ and orientation direction cosine vector $m\_line_\alpha$ for each model line as follows:

$$m\_line_L = \sqrt{(\Delta x)^2 + (\Delta y)^2 + (\Delta z)^2} = \sqrt{(x_2^T - x_1^T)^2 + (y_2^T - y_1^T)^2 + (z_2^T - z_1^T)^2}$$

and if $m\_line_L \neq 0$ then $m\_line_\alpha = \begin{bmatrix} \Delta x / m\_line_L \\ \Delta y / m\_line_L \\ \Delta z / m\_line_L \end{bmatrix}$, else $m\_line_\alpha = \begin{bmatrix} 0 \\ 0 \\ 0 \end{bmatrix}$.

parse_model_lines

The parse_model_lines procedure truncates the list of $m\_lines$ to only those which are in the sensor FOV. It must be executed at least once at the start of 3D_LOAL_LOCK_ON, but can be updated as often as possible considering computer throughput. It must also be executed after any sensor slewing operation.

First the sensor footprint in the matching plane is calculated using the four corners of the image raster as illustrated in figure 20 part a. This footprint is then extended by a multiple of the targeting uncertainty factor as shown in figure 20 part b. Finally, all projected $m\_lines$ which overlap any portion of this extended footprint are marked as PARSED.

Figure 20 illustrates the calculation of the sensor footprint parsing area. Part (a) is the direct sensor footprint projection and part (b) is the footprint extension by the targeting uncertainty.

2D_vector_processing

The 2D_vector_processing procedure generates a missile navigation correction in the 2 axes of the matching plane. The 2D_vector_processing procedure is composed of the following sub-procedures:

1. 2D_line_correspondence
2. 2D_vector_registration
3. 2D_score_surface_processing Figure 21 is a schematic diagram showing the 3 sub-procedures required to generate the cross-range and down-range components of the aimpoint/trackpoint correction vector.

1) The 2D_find_line_correspondence sub-procedure generates a list of line pairs from the parsed_model_lines list and the good_3D_lines list. It considers only the x and y terms of the lines to find these correspondences.

First calculate a projected 2D version of each parsed_model_line and each good_3D_lines as follows:

$$\begin{bmatrix} x_{2D} \\ y_{2D} \end{bmatrix} = \begin{bmatrix} \Delta x / line_L \\ \Delta y / line_L \end{bmatrix} \text{ if } line_L \neq 0, \text{ else } \begin{bmatrix} 0 \\ 0 \end{bmatrix} \text{ otherwise; where } line_L = \sqrt{(\Delta x)^2 + (\Delta y)^2} \text{ with}$$

$\Delta x$ and $\Delta y$ being calculated as before (this is also equivalent to the direction cosines for the line). Next check all combinations of parsed_model_lines and good_3D_lines to see if they are near "parallel" with the following test:

$$\left| \begin{bmatrix} x_{2D} \\ y_{2D} \end{bmatrix}_{G\_LINE} \bullet \begin{bmatrix} x_{2D} \\ y_{2D} \end{bmatrix}_{M\_LINE} \right| \leq T_{PARALLEL} \text{ where } T_{PARALLEL} \text{ is the cosine of the allowed angle}$$

error defining "parallel". For each pair that passes this test perform a distance test.

The distance test has two steps. Step one, for each good_3D_line being considered for a 2D_correspondence_pair calculate a 2D buffer box around it using the projected missile targeting uncertainty $[\sigma x_M \quad \sigma y_M]$ as illustrated in figure 22 part a. Next for each parsed_model_line which passed the "parallel" test with this good_3D_line see if its midpoint is inside the 2D buffer box as illustrated in figure 22 part b. If it is add the good_3D_line/parsed_model_line pair indexes to the 2D_correspondence list for this frame.

Figure 22 parts (a) and (b) show the calculation of 2D_line_correspondence distance test. Part (a) shows the buffer box around the good_3D_line and part (b) shows the intercept calculation with the parse_model_lines.

2) The 2D_vector_registration sub-procedure calculates a best offset estimate for the set of 2D_line_correspondence pairs generated on this frame. The first step is to calculate a perpendicular offset vector for each 2D_line_correspondence pair. This vector is the 2D vector perpendicular to the parsed_model_line and intersecting the midpoint of the good_3D_line. Its calculation is illustrated graphically in figure 23 part a. Next, find the 2D perpendicular bisector of the 2D perdendicular offset vector as illustrated in figure 23 part b; this line may be represented in terms of direction cosines as $c_{ij} = [y_{2D}]_{ij} * x + [-x_{2D}]_{ij} * y$ for good_3D_line (i) and parsed_model_line (j), where $c_{ij} = [y_{2D}]_{ij} * xmid_i + [-y_{2D}]_{ij} * ymid_i$.

Figure 23 shows the 2D perpendicular bi-sector calculation for a 2D_line_correspondence pair. Part (a) is the calcualtion of the normal between the 2 lines and part (b) is the calculation of the perpendicular bi-sector of the normal.

Now for each 2D_line_correspondence pair (ij) find the intersection of it's perpendicular bisector, $\begin{bmatrix} x \\ y \end{bmatrix}_{ij/mn}$ with every other 2D_line_correspondence pair (mn) and accumulate them in a 2D_registration_score_surface array. This is done by incrementing the point $\begin{bmatrix} x \\ y \end{bmatrix}_{ij/mn}$ in the array by the value $\left( \min((line_L)_i, (line_L)_j) + \min((line_L)_m, (line_L)_n) \right)$. The equation for the intersection is:

$$\begin{bmatrix} x \\ y \end{bmatrix}_{ij/mn} = \left[ \begin{matrix} ((c_{ij} * [-x_{2D}]_{mn}) - ([-x_{2D}]_{ij} * c_{mn})) \\ (([y_{2D}]_{ij} * c_{mn}) - ([y_{2D}]_{mn} * c_{ij})) \end{matrix} \right] \Big/ 2 * \det \begin{bmatrix} [y_{2D}]_{ij} & [-x_{2D}]_{mn} \\ [y_{2D}]_{ij} & [-x_{2d}]_{mn} \end{bmatrix}.$$

If the denominator of this equation is zero, then the bisectors are parallel and no accumulation takes place for this (ij)/(mn) pair. The array is equal in size to the missile targeting and navigation uncertainty as projected into the matching plane. The intersection values must be rounded to reflect the array grid resolution. The resolution can be different for different frames, i.e. 4 meters per cell at long range, 2 meters per cell at medium range, and 1 meter per cell at close range, as long as scaling is properly accounted for on each frame. An example score surface is shown in figure 24.

Figure 24 shows an example 2D registration score surface as generated by simulation.

3) The 2D_score_surface_processing procedure finds up to $N_{2D\_PEAKS}$ peak value(s) in the 2D_registration_score_surface, (if recon_prebrief is being used then $N_{2D\_PEAKS} = 1$) and it saves the "best" values over time. A peak is defined as any value in the 2D_registration_score_surface which is greater than all its eight neigbors. If a peak does-not exist on any particular frame then the 2D_registration_score_surface is accumulated over multiple frames until peaks are found. The 2D_registration_score surface may also be normalized by the number of good_3D_lines or parsed_model_lines used on a particular frame. Thus, peak k consists of the three element vector $[x \ y \ s]_k^{PEAK}$ where s is the 2D_registration_score_surface value.

2.5D_vector_processing

The 2.5D_vector_processing procedure generates a missile navigation correction in the third axis of the matching plane. The 2.5D_vector_processing procedure is composed of the following sub-procedures:

1) 2.5D_find_line_correspondence
2) 2.5D_vector_registration
3) 2.5D_histogram_processing Figure 25 is a schematic diagram of the 3 sub-procedures required to calculate a 2.5D registration or the altitude correction for the aimpoint/trackpoint vector.

These matches are in reality 3D matches, however, since only a few points in the totally 3D search volume are examined it is referred to as 2.5D. The reason for this sparse search is to greatly reduce computation time.

1) The 2.5D_find_line_correspondence sub-procedure generates a list of 2.5D_line_correspondence pairs. This list is generated from the parsed_model_lines list and the good_3D_lines at each peak output from the previous procedure. All matching for the 2.5D_vector_processing procedure is calculateded in the terminal coordinates system. First, for each peak k, all good_3D_lines are translated by $[x \ y]_k^{PEAK}$. For the 3D_wireframe_prebrief or recon_prebrief-nadir case the translation is already in the terminal coordinate system. For the recon_prebrief-non-nadir case the translation value $[x \ y]_k^{PEAK}$ and all good_3D_lines must be tranformed back into the terminal coordinate system using $D_{PB \to T} = D_{PB \to E}' * D_{E \to T}'$ before being processed.

Next all combinations of parsed_model_lines and good_3D_lines are checked to see if they are near "parallel" with the following test:

$$\left| \begin{bmatrix} x_{3D} \\ y_{3D} \\ z_{3D} \end{bmatrix}_{G\_LINE} \bullet \begin{bmatrix} x_{3D} \\ y_{3D} \\ z_{3D} \end{bmatrix}_{M\_LINE} \right| \leq T_{PARALLEL}$$ where $T_{PARALLEL}$ is again the cosine of the allowed angle error defining "parallel" and $\begin{bmatrix} x_{2D} \\ y_{2D} \\ z_{2D} \end{bmatrix} = \begin{bmatrix} x/line_L \\ y/line_L \\ z/line_L \end{bmatrix}$ if $line_L \neq 0$, else $\begin{bmatrix} 0 \\ 0 \\ 0 \end{bmatrix}$ otherwise;

where $line_L = \sqrt{(\Delta x)^2 + (\Delta y)^2 + (\Delta z)^2}$ with $\Delta x, \Delta y$ and $\Delta z$ being calculated as before (this is also equivalent to the 3D direction cosines for the line). Note, for recon_prebrief-non-nadir case use $\Delta z$ equal zero on model_lines since altitude reference lines are assumed to be horizontal in mission planning. For each pair that passes this test perform a distance test.

Figures 26A, 26B:
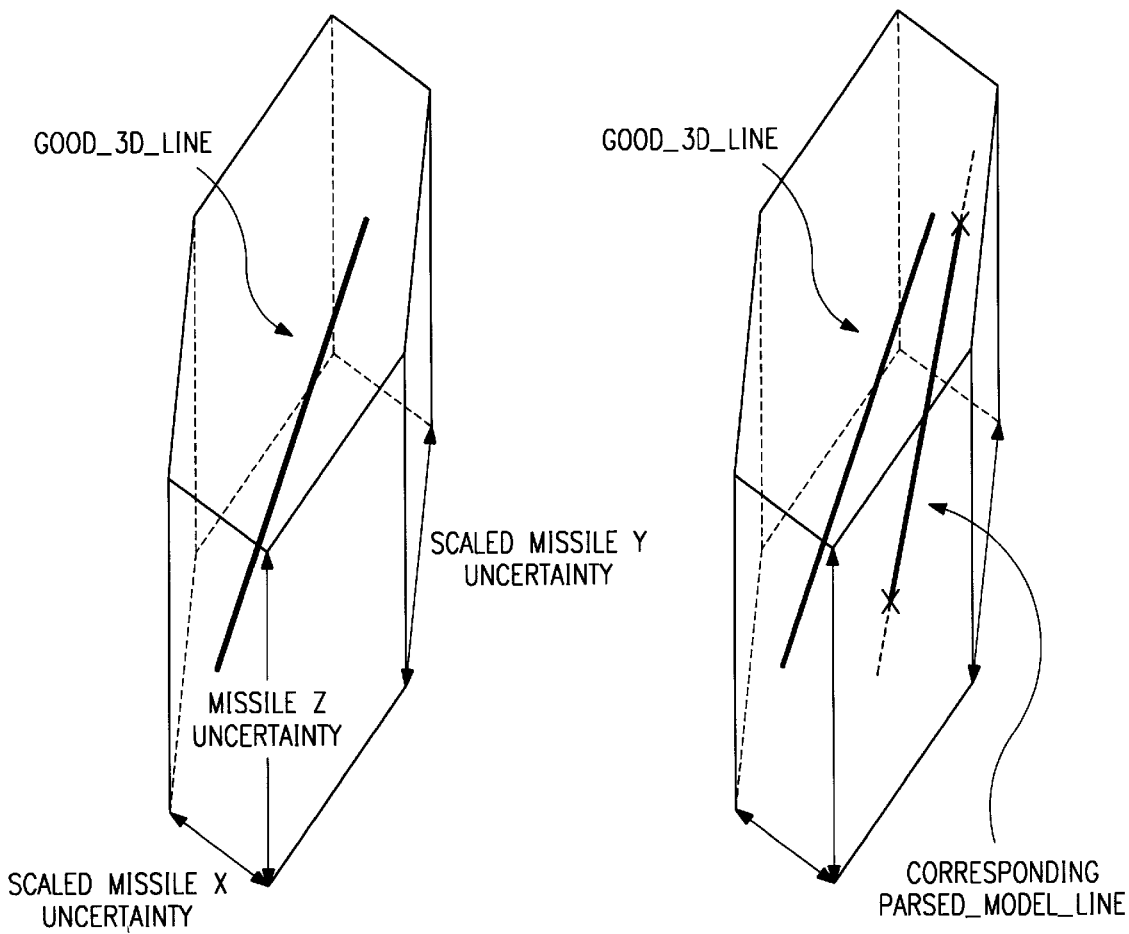
FIGS. 26(A) and (B) show the calculation of the 2.5D_line_correspondence distance test with (A) showing the buffer box around the good_3D_line and (B) showing the intercept calculation with the parse_model_lines.

The distance test has two steps. Step one, for each translated good_3D_line being considered for a 3D_correspondence_pair calculate a 3D buffer box around it using a reduced scale value of the missile targeting $K_{2.5D} * [\sigma x_M \quad \sigma y_M]$ uncertainty and full scale value of the missile z uncertainty $[\sigma z_M]$ ( as projected into the matching plane) as illustrated in figure 26 part a. Next for each parsed_model_line which passed the "parallel" test with this good_3D_line see if its midpoint is inside the 3D buffer box as illustrated in figure 26 part b. If it is add the good_3D_line/parsed_model_line pair indexes to the 2.5D_correspondence list for this frame.

Figure 26 parts (a) and (b) show the calculation of the 2.5D_line_correspondence distance test. Part (a) shows the buffer box around the good_3D_line and part (b) shows the intercept calculation with the parse_model_lines.

Note for all recon_prebriefs only the parsed_model_lines which are in the first $N_{ALT\_LINES}$ are processed for 2.5D.

2) The 2.5D_vector_registration sub-procedure calculates a histogram of altitude offset vectors for each peak of this frame. The calculation takes place in the terminal coordinate system. The histogram is composed of the accumulated Δz components of each 3D_line_correspondence pair generated for a given peak. The Δz value is computed by first projecting the 3D_line_correspondence pair into the x,z or y,z plane according to which is "most" parallel and then calculating the 2D offset vector parallel to the z-axis, eminating from the projected parsed_model_line and intersecting the good_3D_line midpoint. An example is shown in figure 27.

Figure 27:
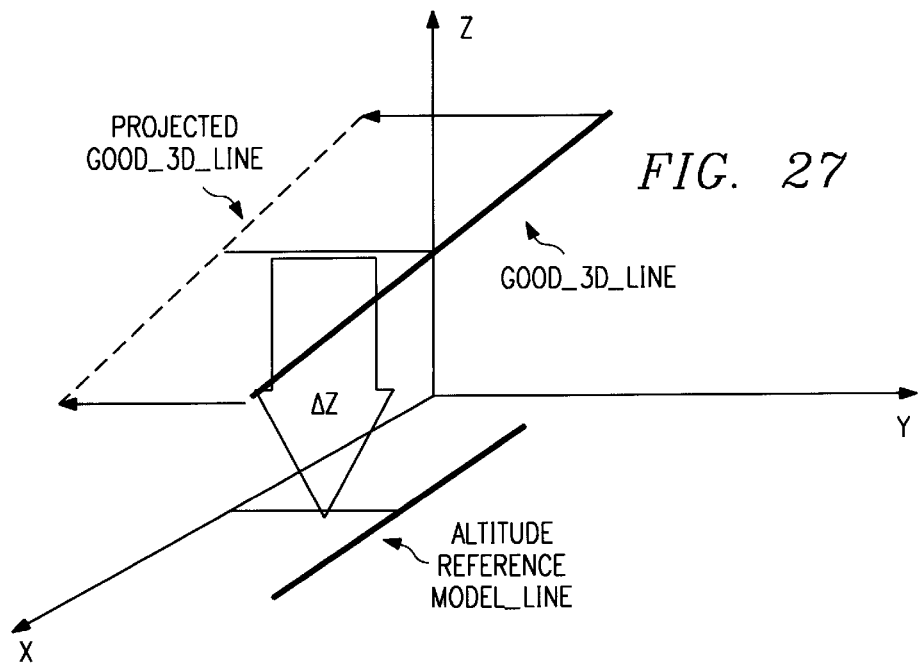
FIG. 27 illustrates the calculation of the z offset component for a 2.5D_line_correspondence pair.

Figure 27 illustrates the calculation of the z offset component for a 2.5D_line_correspondence pair.

The z histogram value at Δz is incremented by the value $\min\left((line_L)_{M\_LINE}, (line_L)_{G\_LINE}\right)$.

3) The 2.5D histogram processing sub-procedure tracks the best overall match values while the 3D_LOAL_LOCK_ON phase is executing.

- For the 3D_wireframe_prebrief case the x,y location of the peak generating the single highest z-histogram value is carried forward as the "best" estimate of the downrange and crossrange components of the trackpoint/aimpoint correction vector and the z bin of this highest peak in the z-histogram is used as the altitude component of the correction vector, i.e., $$\begin{bmatrix} x \\ y \\ z \end{bmatrix}^T_{CORRECT} = \begin{bmatrix} x_{2.5D\_BEST} \\ y_{2.5D\_BEST} \\ z_{z\_BIN\_BEST} \end{bmatrix}.$$

- For a recon_prebrief the "best" x,y location, as projected into the terminal coordinate system, from the previous procedure is used as the downrange and crossrange component of the trackpoint/aimpoint correction vector and the z-bin of the highest peak in the z-histogram is used as the altitude component of the correction vector, i.e., $$\begin{bmatrix} x \\ y \\ z \end{bmatrix}^T_{CORRECT} = \begin{bmatrix} x_{2D\_BEST} \\ y_{2D\_BEST} \\ z_{z\_BIN\_BEST} \end{bmatrix}$$

aimpoint_processing

When the maximum z value reaches some minimum value, $T_{RANGE\_TRACK}$, 3D_LOAL transitions to the 3D_LOAL_TRACK stage. The following actions are involved in transition to track:

- the trackpoint/aimpoint correction vector is added to the missile aimpoint and trackpoint locations,
- the new aimpoint is copied to the sensor staring point,
- the aimpoint/trackpoint correction vector is used to tracnslate the prebrief model to the corrected coordinates for use in the 3D_LOAL_TRACK phase.[1]
- the target location/missile guidance uncertainty error is collapsed to the missile inertial navigation uncertainty for small distances, i.e, $$[\sigma x_M \quad \sigma y_M \quad \sigma z_M] = K_{TRACK} * [\sigma x_M \quad \sigma y_M \quad \sigma z_M].$$

---

[1] If the correction to the sensor pointing vector is large the sensor pointing transition may be made gradually to avoid a sudden loss of matching lines and therefore loss of updates to the *aimpoint_correction_vector*.

3D_LOAL_TRACK:

The purpose of this phase is to provide "fine" or small corrections to the aimpoint correction vector to achieve the final desired CEP. In 3D_LOAL_TRACK the 3D_LOAL algorithm continues to execute the 3D_LOAL_ACQUIRE_3D_LINES and 3D_LOAL phases of the algorithm. In actuallity 3D_LOAL_TRACK is 3D_LOAL_LOCK_ON executing at a higher frame rate and a reduced parsed_model_line list. The higher frame rate is achieved by 2 factors:

1. the navigation and targetting errors are greatly reduced thus 3D_LOAL_LOCK_ON snapshot(s) execute much faster,
2. the shrinking sensor footprint results in fewer good_3d_lines being generated and fewer model_lines being parsed.

The only other difference is the set of parameters used during execution. Specifically they are:

This phase continues to execute until $R_{LOS}$ falls below the blind range, $T_{RANGE\_BLIND}$. This is the point at which the missile can no longer effectively change its impact point via guidance commands and is missile airframe dependent.

References:

- [B] Burns, Brian, et. al., "Extracting Straight Lines," IEEE Trans. on Pattern Analysis and Machine Intelligence, PAMI-8, pp 425-455, July 1986.
- [D] Ditzler, W. R., et.al. , "Multispectral Image Correlation for Air to Ground Targeting," presented at symposium for "Low-Level and Nap of the Earth (N.O.E.) Night Operations," Rome, Italy, October, 1994.
- [F] Forman, Arthur, et.al., "Multisensor Target Recognition system (MUSTRS)," proceedings of 24th Asilomar Conference on Signals, Systems, and Computer, IEEE computer society press, Pacific Grove, California, 1993.
- [G] Giles, Brent, Miller, Keith, Newton, Scott, "Advanced Tracker Algorithm Description," TI Internal Memo, May, 1995.
- [J] [Roberts, Sobel, Prewitt] - Jain, Anil K., "Fundamentals of Digital Image Processing," Prentice Hall, 1989.
- [K] Khoral Research Inc., Alburquerque, New Mexico.
- [L] Lundgren, Jim, "Registration Algorithm," TI Internal report, March, 1993.
- [M] [Kalman filter] - Melsa, James A. and Cohn, David L., "Decision and Estimation Theory," McGraw Hill, 1978.
- [S] Shen, J. and Castan, S., "Further results of DRF Method for Edge Detection," 9th International Conference on Pattern Recognition, Rome, 1988.
- [V] [hidden-lines, perspective-views, line-clipping] - Van Dam, Foley, "Fundamentals of Interactive Computer Garphics," Addison Wesley, 1983.
- [Z] Zhang, Zhengyou, "Estimating Motion and Structure from Correspondences of Line Segments between Two Perspective Images," IEEE Transactions on Pattern Analysis and Machine Intelligence, PAMI-17, pp 1129-1139, December, 1995

Definitions:

- Aimpoint - the point the missile tries to guide to in the target area.
- DCM or Direction Cosine Matrix - A 3x3 matrix which transforms a vector from one 3D coordinate system to another by multiplication.
- ECEF coordinate system - A right handed three dimensional cartesian coordinate system which has an origin at the center of the earth, a Z vector throught the North pole and an X vector through the intersection of the equator and the Greenwich meridian.
- Geodetic - Latitude, longitude, and Altitude above sea-level.
- Ground Plane - Plane tangential to the earth's surface at the Altitude of the prebriefed trackpoint.
- LOAL - Lock On After Launch.
- Missile Up Vector - The vector which eminates from the missiles center of gravity and points directly up from the center of the earth.
- Missile Body vector - The vector which eminates from the missiles center of gravity and points through the missile's nose.
- Trackpoint - the point the missile tries to register on in the target area.

Definition of Processing input/output entities:

- *prebrief* - set of lines describing target scene and aimpoint.
- *3D_wireframe_prebrief* - a *prebrief* generated from a 3D wire frame model.
- *recon_prebrief-nadir* - a *prebreif* generated from a reconaissance photo taken from directly overhead of the target.

- *recon_prebrief-non-nadir* - a *prebreif* generated from a reconaissance photo taken at an off-center angle from the target.
- *2D_line* - a set of line measurements extracted from a single scene or snapshot.
- *2D_track* - a set of 2D_line measurements tracked over 2 or more frames.
- *2D_t2l* - perpendicular distance between a 2D_track and a 2D_line.
- *3D_line* - a 3D line generated by a confirmed_2D_track.
- *good_3D_lines* - a 3D_line whos variance is below a quality control threshold.
- *model_line* - a 3D_line from a prebrief.
- *parsed_model_line* - a prebreif model_line which intersects all or part of the seeker footprint.
- *2D_line_correspondence pair* - a projected good_3D_line and projected parsed_model_line which pass a 2D angle and distance nearness test.
- *2D_registration_score_surface* -
- *3D_line_correspondence pair* - a good_3D_line and parsed_model_line which pass a 3D angle and distance nearnest test.
- *aimpoint/trackpoint correction vector* - 3D vector generated by offset of "best" peak in vector registration processing.
- *current_track_index* - a running index indicating the total number of tracks allocated so far.
- *2D_DELETE_ALL* - 3D_LOAL flag causing all 2D_tracks to be deleted.
- *3D_DELETE_ALL* - 3D_LOAL flag causing all 3D_lines to be deleted.
- *3D_LOAL_RESTART* - 3D_LOAL flag causing 3D_LOAL to be restarted at the 3D_LOAL_START phase.
- *ASSOCIATED* - status of a 2D_track and 2D_line which match each other on a particular frame.
- *CLAIMED* - status of a 3D_line and 2D_track which match each other on a particular frame.
- *CONFIRMED* - status of a 2D_track passing a preset age requirement that has been ASSOCIATED on a particular frame.
- *COASTING* - status of a 2D_track which has been CONFIRMED in the past but is not ASSOCIATED on the current frame.
- *FORCED* - deletion of 2D_tracks or 3D_lines only to free memory.
- *L_INITTED* - status of a 3D_line which has a "true" 3D line value calculated but has not become a good_3D_line.
- *NEW* - status of a 2D_track or 3D_line on its first frame.
- *PARSED* - status of a prebreif model_line which is calculated to be in the sensor FOV.
- *P_INITTED* - status of a 3D_line which has only it's initiallizing plane calculated.
- *USED* - status of a slot in the 3D_line buffer on frames in which it is CLAIMED.
- *UNUSED* - status of a slot in the 3D_line buffer on frames in which it is UNCLAIMED.
- *UNCLAIMED* - status of 3D_line and 2D_track which do not match on a particular frame.
- *UPDATED* - status of a 3D_line after it undergoes kalman filtering on a particular frame.

Definition of Processing Parameters:

- $D_{CLIP}$ - distance (in meters) around trackpoint in which lines are output for the prebreif model.
- $Ix_{fov}$ - instantaneous FOV of a single pixel in the horizontal image raster.
- $Iy_{fov}$ - instantaneous FOV of a single pixel in the vertical image raster.
- $K_{2.5D}$ - uncertainty reduction factor for 2.5_line_correspondence calculation.
- $K_a$ - angle weight in 2D_track association test metric.
- $K_\alpha$ - alpha filter weighting factor in 2D_track_angle propagation filter.

- $K_d$ - distance weight in 2D_track association test metric.
- $K_{TRACK}$ - missile navigation uncertainty reduction factor from 3D_LOAL_LOCK_ON to 3D_LOAL_TRACK.
- $K\sigma^2_{POS\_PROC}$ - 2D_track position process noise.
- $K\sigma^2_{SIZE\_PROC}$ = 2D_track size process noise.
- $K\sigma^2_{POS\_MEAS}$ - 2D_track position measurement noise.
- $K\sigma^2_{SIZE\_MEAS}$ - 2D_track size measurement noise.
- $K\sigma^2_{POS\_INIT}$ = 2D_track position variance initial value.
- $K\sigma^2_{SIZE\_INIT}$ = 2D_track size variance initial value.
- $K\sigma^2_{VEL\_INIT}$ = 2D_track velocity variance initial value.
- $K\sigma^2_P$ = 3D_line covariance initial value.
- $K\sigma^2_Q$ = 3D_line process noise.
- $K\sigma^2_R$ = 3D_line measurement noise.
- $N_{2D\_PEAKS}$ - maximum number of 2D peaks retained on a 2D_vector_registration.
- $N_{ALT\_LINES}$ - number of altitude reference lines in a recon_prebrief.
- $N_{MAX\_2D\_LINES}$ - maximum number of 2D_lines allowed on a frame.
- $N_{MAX\_2D\_TRACKS}$ - maximum number of 2D_tracks allowed in the system.
- $N_{MAX\_GOOD\_3D\_LINES}$ - maximum number of good_3D_lines allowed in the system.
  $N_{MODEL\_LINES}$ - number of model lines in a prebrief.
- $N_{PHASES}$ - number of angle based partitions that 2D_lines and 2D_tracks are separated into.

Definition of Processing Thresholds:

- $T_{\Delta\alpha}$ - 2D_track association angle test threshold (in radians).
- $T_{\Delta r}$ - 2D_track association horizontal distance test threshold (in radians).
- $T_{\Delta r}$ - 2D_track association vertical distance test threshold (in radians).
- $T_{GAP}$ - line merge extenstion threshold (in pixels).
- $T_{M\_CONFIRMED}$ - number of frames 2D_track must be ASSOCIATED on before in can be CONFIRMED.
- $T_{N\_CONFIRMED}$ - number of frames allowed for 2D_track to be CONFIRMED.
- $T_{NUM\_G\_LINES}$ - number of good_3D_lines required before 3D_LOAL_LOCK_ON phase can start.
- $T_{PARALLEL}$ - parallel angle test threshold.
- $T_{RANGE\_BLIND}$ - blind range threshold.
- $T_{RANGE\_START}$ - 3D_LOAL start range.
- $T_{RANGE\_TRACK}$ - 3D_LOAL_TRACK start range.
- $T_{TOUCH\_x}$ - 2D_line horizontal edge "touch" test threshold (in pixels).

- $T_{TOUCH\_Y}$ - 2D_line vertical edge "touch" test threshold (in pixels).
- $T_{TRACK\_DELETE}$ - 2D_track delete threshold (in frames).
- $T_{3D\_DELETE}$ - 3D_track delete threshold (in frames).
- $T_{SLOPE\_TEST\_V}$ - percent deviation from last slope quality control check threshold for vertical lines.
- $T_{INTCPT\_TEST\_V}$ - percent deviation from last intercept quality control check threshold for vertical lines.
- $T_{NORM\_TEST\_V}$ - percent dilution of normal vector quality control check threshold for vertical lines.
- $T_{START\_TEST\_V}$ - percent deviation from last start distance quality control check threshold for vertical lines.
- $T_{STOP\_TEST\_V}$ - percent deviation from last stop distance quality control check threshold for vertical lines.
- $T_{SLOPE\_TEST\_H}$ - percent deviation from last slope quality control check threshold for horizontal lines.
- $T_{INTCPT\_TEST\_H}$ - percent deviation from last intercept quality control check threshold for horizontal lines.
- $T_{NORM\_TEST\_H}$ - percent dilution of normal vector quality control check threshold for horizontal lines.
- $T_{START\_TEST\_H}$ - percent deviation from last start distance quality control check threshold for horizontal lines.
- $T_{STOP\_TEST\_H}$ - percent deviation from last stop distance quality control check threshold for horizontal lines.

I claim:

1. A method for guiding a projectile to a target comprising the steps of:
   (a) providing a projectile moving relative to a target;
   (b) providing a data base containing a three dimensional representation of unique features of said target;
   (b) continually forming on-line three dimensional images of a region including said target as viewed from some object;
   (c) adjusting data from said data base to provide a calculated three dimensional representation of said target as it would be currently viewed from the object;
   (d) comparing said viewed three dimensional images to said calculated three dimensional representation in said data base; and
   (e) locating said target upon a predetermined match of said viewed target and said calculated target.

2. The method of claim 1 wherein said projectile is a steerable missile.

3. The method of claim 1 wherein said step of continually forming on-line three dimensional images includes the step of forming said images at said projectile.

4. The method of claim 1 wherein said step of continually forming on-line three dimensional images includes the step of forming said images at said steerable missile.

5. The method of claim 1 further including the step of comparing said three dimensional images of said region including said target with said data base until said target is recognized from said three dimensional images.

6. The method of claim 2 further including the step of comparing said three dimensional images of said region including said target with said data base until said target is recognized from said three dimensional images.

7. The method of claim 3 further including the step of comparing said three dimensional images of said region including said target with said data base until said target is recognized from said three dimensional images.

8. The method of claim 4 further including the step of comparing said three dimensional images of said region including said target with said data base until said target is recognized from said three dimensional images.

9. The method of claim 5 further including the step of directing said projectile to said recognized target after recognition of said target.

10. The method of claim 6 further including the step of directing said projectile to said recognized target after recognition of said target.

11. The method of claim 7 further including the step of directing said projectile to said recognized target after recognition of said target.

12. The method of claim 8 further including the step of directing said projectile to said recognized target after recognition of said target.

13. The method of claim 1 wherein said data base is remote from said projectile and said steps of continually forming on-line three dimensional images of a region including said target as viewed from some object, adjusting data from said data base to provide a calculated three dimensional representation of said target as it would be currently viewed from the object, comparing said viewed three dimensional images to said calculated three dimensional representation in said data base, and locating said target upon a predetermined match of said viewed target and said calculated target are performed at a location remote from said projectile.

14. The method of claim 2 wherein said data base is remote from said projectile and said steps of continually forming on-line three dimensional images of a region including said target as viewed from some object, adjusting data from said data base to provide a calculated three dimensional representation of said target as it would be currently viewed from the object, comparing said viewed three dimensional images to said calculated three dimensional representation in said data base, and locating said target upon a predetermined match of said viewed target and said calculated target are performed at a location remote from said projectile.

15. The method of claim 5 wherein said data base is remote from said projectile and said steps of continually forming on-line three dimensional images of a region including said target as viewed from some object, adjusting data from said data base to provide a calculated three dimensional representation of said target as it would be currently viewed from the object, comparing said viewed three dimensional images to said calculated three dimensional representation in said data base, and locating said target upon a predetermined match of said viewed target and said calculated target are performed at a location remote from said projectile.

16. The method of claim 6 wherein said data base is remote from said projectile and said steps of continually forming on-line three dimensional images of a region including said target as viewed from some object, adjusting data from said data base to provide a calculated three dimensional representation of said target as it would be currently viewed from the object, comparing said viewed three dimensional images to said calculated three dimensional representation in said data base, and locating said target upon a predetermined match of said viewed target and said calculated target are performed at a location remote from said projectile.

17. The method of claim 9 wherein said data base is remote from said projectile and said steps of continually forming on-line three dimensional images of a region including said target as viewed from some object, adjusting data from said data base to provide a calculated three dimensional representation of said target as it would be currently viewed from the object, comparing said viewed three dimensional images to said calculated three dimensional representation in said data base, and locating said target upon a predetermined match of said viewed target and said calculated target are performed at a location remote from said projectile.

18. The method of claim 10 wherein said data base is remote from said projectile and said steps of continually forming on-line three dimensional images of a region including said target as viewed from some object, adjusting data from said data base to provide a calculated three dimensional representation of said target as it would be currently viewed from the object, comparing said viewed three dimensional images to said calculated three dimensional representation in said data base, and locating said target upon a predetermined match of said viewed target and said calculated target are performed at a location remote from said projectile.

* * * * *